US011074231B1

(12) United States Patent
Emek et al.

(10) Patent No.: US 11,074,231 B1
(45) Date of Patent: Jul. 27, 2021

(54) VALIDATING MODIFICATIONS TO MAPPING STATEMENTS FOR PROCESSING HIERARCHICAL DATA STRUCTURES

(71) Applicant: Informatica Corporation, Redwood City, CA (US)

(72) Inventors: Roy Emek, Tel Aviv (IL); Barak Adorian, Tel Aviv (IL); Ido Grabinsky, Tel Aviv (IL); Itai Kranz, Central District (IL); Rahul Gudla, Bangalore (IN); Boris Bulanov, Laconia, NH (US)

(73) Assignee: INFORMATICA LLC, Redwood City, CA (US)

( * ) Notice: Subject to any disclaimer, the term of this patent is extended or adjusted under 35 U.S.C. 154(b) by 0 days.

(21) Appl. No.: 14/216,215

(22) Filed: Mar. 17, 2014

Related U.S. Application Data

(60) Provisional application No. 61/799,904, filed on Mar. 15, 2013.

(51) Int. Cl.
*G06F 16/81* (2019.01)
*G06F 16/21* (2019.01)
*G06F 16/23* (2019.01)

(52) U.S. Cl.
CPC ........ *G06F 16/213* (2019.01); *G06F 16/2365* (2019.01); *G06F 16/81* (2019.01)

(58) Field of Classification Search
CPC ........... G06F 17/30589; G06F 17/2247; G06F 17/30371; G06F 17/30297; G06F 16/2365; G06F 16/81; G06F 16/213
USPC ........................................ 707/763, 778, 634
See application file for complete search history.

(56) References Cited

U.S. PATENT DOCUMENTS

| | | | | |
|---|---|---|---|---|
| 5,767,854 | A | 6/1998 | Anwar | |
| 6,028,602 | A | 2/2000 | Weidenfeller et al. | |
| 6,279,005 | B1 * | 8/2001 | Zellweger | G06F 16/904 |
| 6,823,495 | B1 * | 11/2004 | Vedula | G06F 8/34 715/763 |
| 6,853,997 | B2 * | 2/2005 | Wotring | G06F 16/94 707/756 |
| 7,003,722 | B2 | 2/2006 | Rothchiller et al. | |
| 7,007,033 | B1 | 2/2006 | Rothchiller et al. | |
| 7,487,439 | B1 * | 2/2009 | Lo | G06F 16/86 715/234 |

(Continued)

*Primary Examiner* — Ashish Thomas
*Assistant Examiner* — Nargis Sultana
(74) *Attorney, Agent, or Firm* — Amardeep S. Grewal; Reed Smith LLP

(57) ABSTRACT

A system and a method are disclosed for processing hierarchical data structures, for example, XML (extensible markup language) documents. A tree view shows a visual representation of the input schema and the output schema and visual representations of associations between nodes from the input schema and output schema. A grid view shows mapping statements configured to map the input hierarchical data structure conforming to the input schema to an output hierarchical data structure conforming to the output schema. The grid view and the tree view are synchronized such that modifications performed using any one view result in corresponding modifications being presented in the other view. Modifications to mapping statements are validated to determine if path expressions used in the mapping statements are valid in the modified mapping statements.

21 Claims, 21 Drawing Sheets

(56) References Cited

U.S. PATENT DOCUMENTS 8,417,676 B2 * 4/2013 Petri ........................ G06F 16/40 707/694
8,495,176 B2 * 7/2013 Herbeck ............... G06F 9/5055 709/219
8,725,774 B2 * 5/2014 Meunier ................. G06F 16/80 707/794
9,201,558 B1 * 12/2015 Dingman ................ G06F 15/16
2002/0010700 A1 1/2002 Wotring et al.
2002/0184401 A1 * 12/2002 Kadel, Jr. ................. G06F 9/54 719/315
2003/0140308 A1 * 7/2003 Murthy ................. G06F 16/284 715/234
2004/0015783 A1 1/2004 Lennon et al.
2004/0060003 A1 * 3/2004 Mani ..................... G06F 40/143 715/234
2004/0088306 A1 * 5/2004 Murthy ................... G06F 16/10
2004/0172591 A1 9/2004 Rothschiller et al.
2004/0172592 A1 9/2004 Collie et al.
2004/0172616 A1 * 9/2004 Rothschiller ......... G06F 40/143 717/114
2004/0181543 A1 9/2004 Wu et al.
2004/0193575 A1 * 9/2004 Chen ..................... G06F 16/289
2004/0199524 A1 * 10/2004 Rys ....................... G06F 16/258
2005/0050016 A1 * 3/2005 Stanoi ................. G06F 16/9027
2005/0050068 A1 * 3/2005 Vaschillo .............. G06F 16/258
2005/0060647 A1 3/2005 Doan et al.
2005/0154992 A1 * 7/2005 Chen ..................... G06F 40/166 715/770
2006/0184551 A1 * 8/2006 Tarachandani ...... G06F 16/8373
2006/0190310 A1 8/2006 Gudla et al.
2006/0271506 A1 * 11/2006 Bohannon ............... G06F 16/88
2007/0028221 A1 * 2/2007 Ukelson ................ G06F 16/258 717/136
2007/0043702 A1 * 2/2007 Lakshminarayanan ...................... G06F 16/832
2007/0124281 A1 5/2007 Cowan
2007/0179962 A1 * 8/2007 Hernandez-Sherrington .............. G06F 16/258
2007/0185930 A1 * 8/2007 Betz ........................ H04L 67/02
2007/0203922 A1 * 8/2007 Thomas ................ G06F 16/258
2007/0239749 A1 * 10/2007 Farahbod ............ G06F 11/3604
2007/0239762 A1 * 10/2007 Farahbod .................. G06F 8/35
2008/0082375 A1 * 4/2008 Kennis ................... G06Q 10/06 705/7.39
2008/0097959 A1 * 4/2008 Chen ................... G06F 16/8358
2008/0235260 A1 * 9/2008 Han ......................... G06F 40/14
2008/0244382 A1 * 10/2008 Petri ................... G06F 16/9577 715/237
2008/0256124 A1 10/2008 Hernandez-Sherrington et al.
2009/0112887 A1 * 4/2009 Weber ..................... G06F 16/84
2009/0183028 A1 * 7/2009 Arnold ................... G06Q 10/06 714/16
2009/0217302 A1 * 8/2009 Grechanik ............ G06F 11/368 719/320
2009/0307186 A1 * 12/2009 Hoshino ............. G06F 16/8365
2010/0082703 A1 4/2010 Zhou et al.
2010/0250519 A1 * 9/2010 Fiebig ................. G06F 21/6227 707/718
2010/0299327 A1 * 11/2010 Kiefer ................. G06F 16/8358 707/736
2011/0302187 A1 * 12/2011 Otsuka ................ G06F 16/2425 707/768
2012/0041932 A1 * 2/2012 Harman .................. G06F 8/437 707/694
2012/0117124 A1 * 5/2012 Bruaset ............... G06F 16/2246 707/797
2013/0036352 A1 * 2/2013 Hui ......................... G06F 40/14 715/234
2013/0055065 A1 * 2/2013 Di Blas ................... G06F 40/14 715/234
2013/0080876 A1 * 3/2013 Freese ................... G06F 40/154 715/234
2013/0103705 A1 * 4/2013 Thomas ................ G06F 16/212 707/756
2013/0198237 A1 * 8/2013 Serban .............. G06F 16/24534 707/792
2014/0245269 A1 * 8/2014 Thukkaram ......... G06F 11/3624 717/129

* cited by examiner

855

825

860

865

FIG. 11
Invalid Statement
Statement is not valid in its current context
Input XPath adjustment
Adjust XPath:
concat(./inPersonDetails/inName/inLast, ' ', ./inPersonDetails/inName/inFirst)
Use original XPath:
concat(inName/inLast, ' ', inName/inFirst)
Context Information
Current context (parent input):
/inInput/inChildren/inChild/inHobby
Previous context (parent input):
/inInput/inChildren/inChild/inPersonDetails
Output XPath adjustment
Adjust XPath:
outChild/outName[1]
Use original XPath:
outName[1]
Context Information
Current context (parent output):
/outClasses/outClass
Previous context (parent output):
/outClasses/outClass/outChild
OK
Cancel
1100
1110
1120
1130
1140
1150
1160
1170
1180

VALIDATING MODIFICATIONS TO MAPPING STATEMENTS FOR PROCESSING HIERARCHICAL DATA STRUCTURES

CROSS REFERENCE TO RELATED APPLICATIONS

This application claims the benefit of, and priority to, U.S. Provisional Application No. 61/799,904, filed Mar. 15, 2013, which is incorporated by reference in its entirety.

BACKGROUND

Field of Art

The disclosure relates to processing of hierarchical data structures in general and more specifically to script-based and visual mapping of hierarchical data structures.

Description of the Related Art

Enterprises often represent hierarchical information using standard formats, for example, extensible markup language (XML) format or Javascript object notation (JSON). Hierarchical structures can be complex, having many different levels, and include a very large number of nodes that are linked within and between levels. Furthermore, different portions of a hierarchical structure can be very different structurally. As a result, processing of hierarchical structures can be complex.

A commonly encountered task in processing hierarchical structures is mapping of one hierarchical structure to another. A user may intend to map an input hierarchical data structure to an output hierarchical data structure to transform the input hierarchical data structure to the output hierarchical data structure. Due to the complexity of hierarchical structures themselves, mapping two hierarchical structures also can be a complex process. One conventional mechanism for mapping hierarchical structures is based upon use of scripts for mapping data from one hierarchical structure to another. Using a script to map hierarchical structures can be cumbersome since it requires writing programs in a highly expressive language, for example, Java, XSLT (extensible stylesheet language), or other proprietary languages. Scripts developed for mapping hierarchical structures can be tedious to develop, debug, and understand.

Another conventional mechanism often used for mapping hierarchical structures utilizes visual representation of the hierarchical structures. Visual mapping typically includes graphically displaying nodes as icons connected by lines to represent the mapping relationships. However, visual mapping constructs are typically simplistic and limited in functionality. As a result, visual mapping tools often are insufficient or difficult to use for mapping complex hierarchical structures. For example, for complex hierarchical structures, a visual mapping can become cluttered with icons and overlapping lines and other objects, making the mapping difficult to understand. To summarize, conventional mechanisms for mapping hierarchical structures are either limited in functionality, cumbersome to use, or both.

SUMMARY

Described embodiments allow modifications to mapping statements for processing hierarchical data structures. The mapping statements are organized in a hierarchy such that executing a mapping statement comprises executing mapping statements below the mapping statement in the hierarchy. A request is received to insert a mapping statement at a target location in the hierarchy. The mapping statement specifies one or more path expressions that are defined relative to a context node associated with the mapping statement. A target context node is determined for the mapping statement based on the target location. The system verifies whether path expressions of the mapping statement defined relative to the target context node are valid. If a path expression is determined to be invalid, a message indicating a failure in inserting the mapping statement is sent.

In an embodiment, the hierarchy of mapping statements is configured to transform an input hierarchical data structure to an output hierarchical data structure. The mapping statement determines the value of an output node in the output hierarchical data structure based on a value of an input node in the input hierarchical data structure. The input node and the output nodes are specified using path expressions. The system verifies whether the path expressions for specifying the input node and the output node are valid if they are defined relative to the target context node.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overall System Environment

Figure 1:
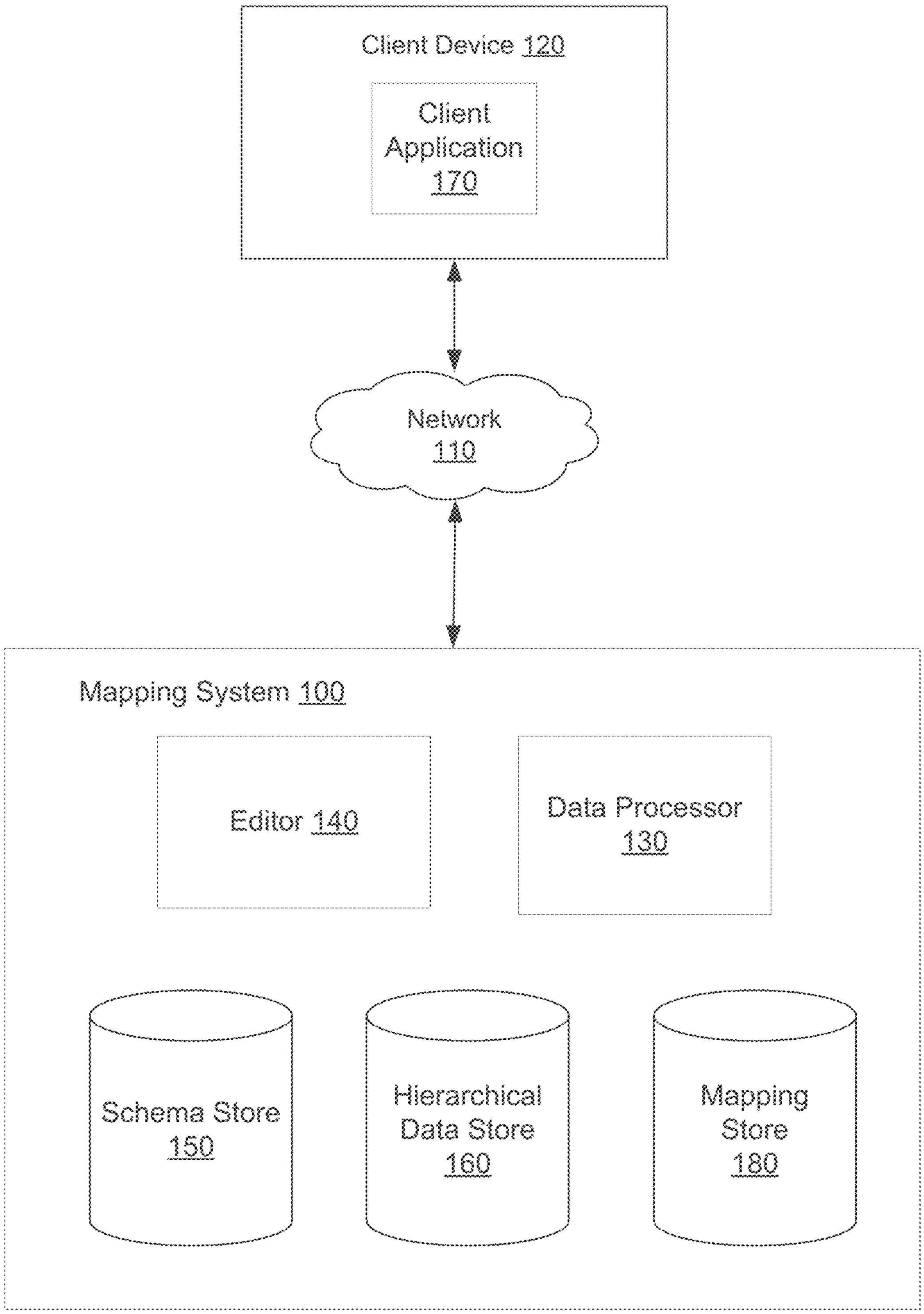
FIG. 1 shows the overall system environment for mapping hierarchical data structures according to an embodiment.

FIG. 1 shows the overall system environment for mapping hierarchical data structures according to an embodiment. The overall system environment includes a mapping system 100, a client device 120, and network 110. The client device 120 interacts with mapping system 100 via network 110. In other embodiments, more or less components than those indicated in FIG. 1 may be used. For example, a user may perform the actions described herein using a display monitor of the mapping system 100 instead of interacting with the mapping system 100 via network 110 using client device 120.

A user interacts with the mapping system 100 using a client device 120. Client device 120 includes a client application 170 that allows a user to interact with the mapping system 100. In an embodiment, the client application 170 is an internet browser, which may include client side programming (e.g., Java Script) when accessing the mapping system 100. In other embodiments, client application 170 is a proprietary application developed for interacting with mapping system 100. Client device 120 can be a conventional computer system (e.g., a desktop or laptop computer), a tablet, or a device having computer functionality such as a personal digital assistant (PDA), a mobile telephone, a smart phone or another suitable device. Client device 120 interacts with mapping system 100 via network 110. Network 110, may comprise any combination of local area and/or wide area networks, using both wired and/or wireless communication systems. In one embodiment, the network 110 uses standard communications technologies and/or protocols.

The mapping system 100 can be a part of an extraction, transformation, and loading (ETL) tool that accesses and integrates data from different system. The ETL tool is configured to process structured data, unstructured data, or semi-structured data. The structured data is represented using databases, for example, relational databases storing data as tables defined using database schemas. The mapping system 100 is configured to transform data represented as a particular hierarchical data structure to data represented as a different hierarchical data structure. For example, the mapping system 100 can transform an input XML document that conforms to a particular schema to an output XML document that conforms to a different schema.

As an example, the mapping system can store an input schema representing customer invoices and an output schema representing a list of customer orders sorted by month of the year. The mapping system also stores a mapping between the input schema and the output schema. The mapping system 100 transforms an input XML document with nodes representing customer and their associated orders to generate an output XML document with nodes representing months, each month node including a group of nodes of customer orders for that month. The output XML document may include additional information, for example, order totals for each month.

The mapping system 100 is hosted on a computing system that includes one or more processors, memory, secondary storage and input/output controller. The computing system used for hosting the mapping system 100 is typically a server class system that uses powerful processors, large memory, and fast input/output systems compared to a typical computing system used, for example, as a client device. The server typically has large secondary storage, for example, using a RAID (redundant array of independent disks) array.

The mapping system 100 includes a data processor 130, an editor 140, a schema store 150, and a hierarchical data store 160, and a mapping store 180. The hierarchical data store 160 stores data represented as hierarchical data structures, for example, XML documents. The hierarchical data structures include nodes representing information that are interconnected with each other (a node is also referred to herein as an element). A node may be a simple node, a complex node, or a repeating node. A simple node is a node that contains only text data. Different types of data may be stored as text including integers, floating point numbers, date, expressions, strings, and so on.

Examples of nodes of a hierarchical data structure based on above elements include <lastname>Smith</lastname>, <age>12</age>, or <dateborn>Jan. 1, 2001</dateborn>. In each of these the data for the name is stored as text characters, but can represent other data types (e.g., numbers and dates).

A complex node is a node that can contain other nodes. Following is an example of a complex node. The “student” node is a complex node that contains two simple nodes “firstname” and “lastname.”

```
<student>
  <firstname>Joe</firstname>
  <lastname>Smith</lastname>
</student>
```

A repeating node is a node that can have multiple occurrences of other nodes. A schema element for a repeating node specifies the maximum number of occurrences for a repeating node to be greater than one. In the following example, “Employee” is a repeating node that occurs within a complex node “Department.” The employee node itself is a complex node that contains simple nodes “FirstName,” “LastName,” and “Role.” The employee node also has an attribute “id.”

```
<Department>
<Name>Research and Development</Name>
<Employee id=“259089785”>
  <FirstName>Thaddeus</FirstName>
  <LastName>Burt</LastName>
  <Role>Consultant</Role>
</Employee>
<Employee id=“289021615”>
  <FirstName>Christen</FirstName>
  <LastName>Fulton</LastName>
  <Role>Worker</Role>
</Employee>
<Employee id=“761338290”>
  <FirstName>Felix</FirstName>
  <LastName>Boyd</LastName>
  <Role>Worker</Role>
</Employee>
</Department>
```

Two nodes of a hierarchical document may be connected by a link. For example, children nodes are connected to a parent node. A link may be implemented as a pointer in a source node pointing at a target node. A link may also be bidirectional, such that a source node stores a pointer to a target node and the target node stores a pointer to a source node. For example, a child node may store a pointer to a parent node and the parent node maintains pointers to its children nodes.

A hierarchical data structure typically has a root node that does not have any parent node. In other words, the root node maybe represented as having a null pointer as a parent node. Remaining nodes that are not root nodes have a non-null parent node and zero or more children nodes. A node may be associated with a level representing the depth of the node below the root node in the hierarchy. For example, the root node may be assumed to be level 0, the children nodes of the root node have level 1, the children of the children of the root node have level 2, and so on.

The metadata for a hierarchical data structure can be specified using a schema. A schema defines the type of information stored in various nodes of the hierarchical data structure, associations between different types of nodes, names of attributes of the nodes, and the types of attributes of the nodes. The following is an example of an XML schema that defines the structure of the hierarchical data representing the XML document, representing a Department as shown above. The example schema shown below is a simplified version of a standard schema. Several elements of a standard schema are not included for sake of simplicity.

```
<xs: schema>
  <xs:element name="Department">
    <xs:complexType>
      <xs:sequence>
        <xs:element name="Name" type="xs:string"/>
        <xs:element ref="Employee" maxOccurs="unbounded"/>
      </xs:sequence>
    </xs:complexType>
  </xs:element>
  <xs:element name="Employee">
    <xs:complexType>
      <xs:attribute name="id" type="xs:string"/>
      <xs:element name="FirstName" type="xs:string"/>
      <xs:element name="LastName" type="xs:string"/>
      <xs:element name="Role" type="xs:string"/>
    </xs:complexType>
  </xs:element>
  ...
</xs: schema>
```

The schema itself is represented as an XML document. The schema comprises one or more nodes called “elements.” The element “<xs:element name=“Department”>” in the above schema specifies that the XML document contains a node with name “Department.” The elements “<xs:complexType>” and “<xs:sequence>” specify that the Department node has a complex type that includes a sequence of nodes. The sequence of nodes includes a node “Name” that represents a name of the Department. An example of a node that conforms to schema element “<xs:element name=“Name” type=“xs:string”/>” is the node “<Name>Research and Development</Name>” in the Department XML shown above. The sequence also includes one or more nodes of type “Employee.”

The schema further specifies the structure of the Employee node. As shown in the schema the Employee node is a complex type. The element “<xs:attribute name=“id” type=“xs:string”/>” specifies that the Employee node has an attribute “id.” The elements “<xs:element name=“FirstName” type=“xs:string”/>,” “<xs:element name=“LastName” type=“xs:string”/>,” and “<xs:element name=“Role” type=“xs:string”/>” specify the nodes “FirstName,” “LastName,” and “Role” of an Employee node. The schema store 150 stores schemas describing the hierarchical data structures stored in hierarchical data store 160.

The mapping store 180 stores the information describing the mapping between the input schema and the output schema provided by the user. Accordingly, the mapping store 180 stores mapping statements that describe operations used for transforming an input hierarchical data structure to an output hierarchical data structure. The data processor 130 executes the mapping statements corresponding to a mapping and transforms an input hierarchical data structure to an output hierarchical data structure. In an embodiment, the client application 170 of the mapping system 100 provides a widget, for example a run button, to allow a user to execute the mapping statements. The client application 170 is configured to receive information identifying the input hierarchical data structure and a location to store the generated output hierarchical data structure.

The editor 140 is configured to format for display via the client application 170, schemas stored in the schema store 150 and hierarchical data store 160. The editor 140 is further configured to format for display via the client application 170, a user interface for mapping an input schema to an output schema. The mapping system 100 uses the mapping to transform a hierarchical data structure data conforming to the input schema to a hierarchical data structure data conforming to the output schema. For example, the mapping system 100 can transform an input XML document conforming to an input XML schema to an output XML document conforming to an output XML schema.

More particularly, the editor 140 is configured to format for display via the client application 170 a visual representation of the input and output schema for visually specifying the mapping as well as a script representation for specifying the mapping by modifying mapping statements. Certain changes are easier for a user to make using the visual representation whereas other changes may be easier using the script representation. The editor 140 receives modifications to the mapping from client application 170 made using either the visual representation or the script representation. The editor 140 synchronizes the modifications made using the two representations such that modifications made using the visual representation result in updating the script representation and modifications made using the script representation result in updating the visual representation. In an embodiment, the editor 140 formats for display the mapping statements in a text form via the client application 170 in a panel different from a panel showing the visual representations of the schema.

Figure 2:
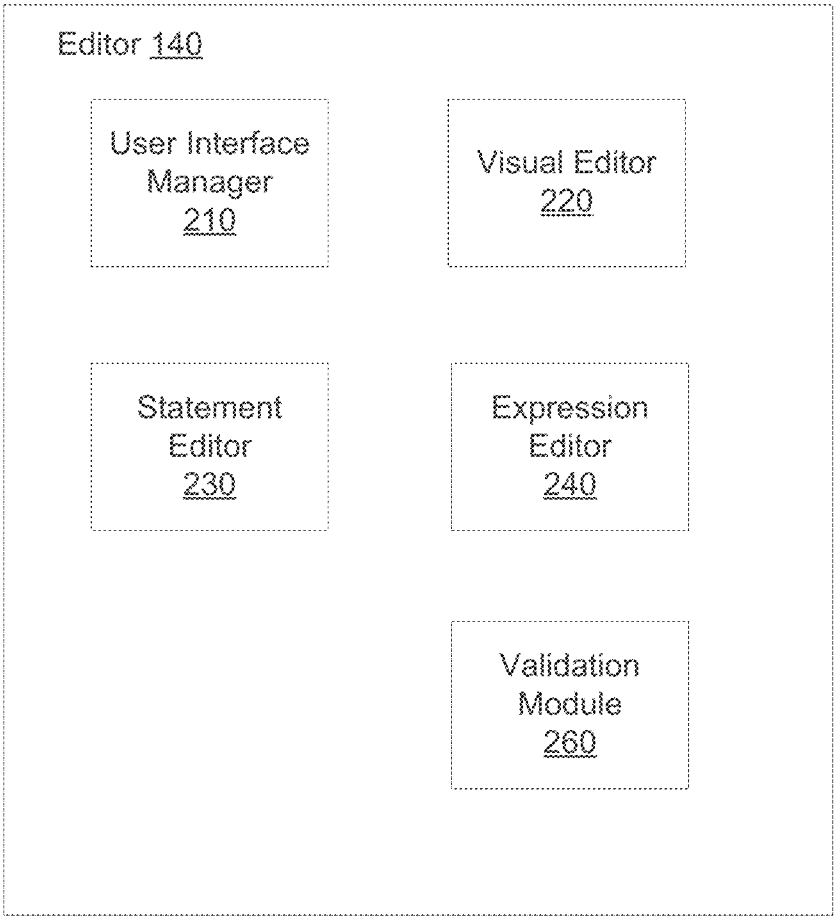
FIG. 2 shows the system architecture of an editor module, according to an embodiment.

FIG. 2 shows the system architecture of the editor 140, according to an embodiment. The editor 140 includes various modules including, user interface manager 210, visual editor 220, statement editor 230, expression editor 240, and a validation module 260. In other embodiments, editor 140 may include other modules not described herein. Functionality indicated as provided by a particular module may be implemented by other modules instead.

The user interface manager 210 manages the layout of the user interfaces presented by the mapping system 100 to the client application 170. In an embodiment, the client application 170 is an internet browser application. In these embodiments, the user interface manager 210 generates the appropriate markup language objects and sends this content to the internet browser application of the client device to render and display the user interfaces. In other embodiments, the client application 170 is a proprietary application, for example, a Java or C++ application. In these embodiments, the user interface manager 210 uses a library to render the user interfaces for display, for example, SWING library of the JAVA programming language.

The visual editor 220 formats for display, visual representations of the mapping, including the visual representations of input schema and output schema and relationships between nodes/attributes of the visual representation. The client application 170 presents the visual representation to the user. The visual editor 220 is configured to present relationships between nodes using a graphical representation, for example, a line or an arc between nodes. The visual editor 220 formats for display via the client application 170, relationships between nodes by organizing the spatial arrangement of the nodes in a visual manner indicating a hierarchy, such as indenting (offsetting) the position of one node with respect to the position of another node. For example, the visual editor 220 may format for display via the client application 170, children nodes of a parent node indented compared to the parent node. The greater the depth (number of levels) between an ancestor node and a descendant node in the hierarchy, the larger the indentation (offset) of the descendant node relative to the ancestor node.

The statement editor 230 formats for display via the client application 170, mapping statements representing the mapping between the input schema and the output schema. The statement editor 230 is configured to format for display via the client application 170, mapping statements in text form using the syntax of a mapping language. Showing statements in text form allows for both greater precision and greater expressibility than provided by visual representations alone. Representing complex expressions in a text form can be easier and faster for a user to comprehend or edit compared to a visual representation based on icons.

The visual editor 220 and statement editor 230 interact with each other to ensure that the representation displayed by a module is synchronized with the information presented in the other module. For example, if the visual editor 220 receives modifications to the mapping via the visual representation from the user, the visual editor 220 notifies the statement editor 230 to modify the mapping statements shown using the script representation to reflect the change. Similarly, if statement editor 230 receives modifications, additions, or deletions of mapping statements via the script representation, the visual editor 220 notifies the visual editor 220 to modify the information presented in the visual representation accordingly.

The visual editor 220 is configured to receive from the client application 170, associations defined by a user between nodes from the input schema and nodes from output schema. In an embodiment, visual editor 220 formats for display a user interface that supports dragging and dropping of a node from input schema to a node of output schema to specify an association between the two nodes. If the visual editor 220 receives from the client application 170, information describing user input associating a node from input schema to a node from output schema, the visual editor 220 shows a visual representation of the association, for example, a link connecting the two nodes. If the visual editor 220 receives any modifications using the visual representations of the mapping from input schema to the output schema, the visual editor 220 sends information describing the modification to the statement editor 230 to update the statements displayed using the script representation. The visual editor 220 also receives from the statement editor 230 any changes to the statements received by the statement editor 230 via the script representation. The visual editor 220 determines corresponding changes to the visual representation based on the changes to the statements received from the statement editor 230 and updates the visual representation of the mapping.

The statement editor 230 is configured to receive from the client application 170, modifications to the mapping statements performed via the script representation. If the statement editor 230 receives modifications to mapping statements performed via the script representation, the statement editor 230 displays the modified statements and also sends information describing the modifications to the visual editor 220. The statement editor 230 also receives from the visual editor 220, modifications performed by a user via the visual representation. The statement editor 230 determines changes to mapping statements corresponding to the changes to the visual representation received from the visual editor 220. The statement editor 230 modifies the mapping statements to reflect the changes received from the visual editor 220 and formats for display via the client application 170, an updated script representation of the mapping.

In an embodiment, if the statement editor 230 receives from the client application 170, a selection of a mapping statement via the script representation, the statement editor 230 notifies the visual editor 220 of the selection. The visual editor 220 displays the nodes of the input schema and output schema processed by the selected mapping statement in a manner that distinguishes the nodes from other nodes, for example, by highlighting them or by displaying the information of the nodes in a font different from the font used for other nodes.

The expression editor 240 is configured to receive from the client application 170, modifications to expressions specified in mapping statements. For example, the expression editor 240 may receive from the client application 170, information describing user input indicating that the user wants to edit an expression. In response to the user input, the expression editor 240 formats for display via the client application 170, a user interface that presents the expression for receiving user inputs specifying modifications to the expression. The expression editor 240 may be invoked from the statement editor 230 or from the visual editor 220.

The validation module 260 validates mapping statements if the statement editor 220 receives modifications to the hierarchy of mapping statements. For example, if the statement editor 220 receives input indicating movement of a mapping statement from one location to another location within the hierarchy of mapping statements, the validation module 260 checks whether the mapping statement is valid in the new location. Further details of how a validation module 260 performs validations of mapping statements are described herein.

Mapping Statements

A mapping statement defines operations to be performed on nodes of the input hierarchical data structure to determine nodes of the output hierarchical data structure. The description herein assumes the hierarchical data structure is represented using XML. However, the principles disclosed herein apply to any other type of hierarchical data structures, for example, JSON objects.

In an embodiment, the mapping system 100 organizes the mapping statements as a hierarchy. Accordingly, the mapping system 100 represents dependencies between mapping statements. A mapping statement can be nested within another mapping statement to create parent-child relationship between mapping statements. The data processor 130 executes a mapping statement by executing all its descendant mapping statements. When the data processor 130 executes the parent statement, it also executes the child statements of the parent statement. The execution of each child statement comprises execution of the child statements of the child statement, and so on.

A mapping statement may specify one or more path expressions that identify nodes of a hierarchical data structure. For example, the input nodes and the output nodes for a mapping statement may be specified using path expressions. In an embodiment, a path expression that identifies nodes of a hierarchical data structure may be represented as an XPath expression. An XPath expression uses standard syntax for identifying nodes or sets of node in an XML document. A path expression comprises various components that correspond to navigation within the hierarchical data structure from a particular node, for example, the root node to the selected nodes. The data processor 130 evaluates the various components of the path expression to evaluate the nodes specified by the path expression.

Different types of mapping statements specify different types of mapping logic. For example, a mapping statement can determine a simple output value from a simple input value, for example, a constant. A mapping statement can determine values for multiple nodes by iterating over multiple input nodes. A mapping statement can perform mapping based on a condition. The type of mapping statement depends on the type of nodes processed by the mapping statement, for example, whether the input node or the output node is simple, complex, or a repeating node.

In response to the visual editor 220 receiving from the client application 170, a mapping from a node of the input schema to a node of the output schema, the visual editor 220 provides the types of the mapped nodes to the statement editor 230. The statement editor 230 determines a type of the mapping statement based on the types of the mapped nodes. Similarly, if the statement editor 230 receives the specification of a mapping statement the client application 170, the statement editor determines the input and output nodes processed by the mapping statements and provides the information to the visual editor 220. The visual editor 220 shows a link between the input node and the output node processed by the mapping statement.

A simple mapping statement specifies a mapping from a simple input value to a simple output value. A simple value is a single value or a constant. If the visual editor 220 receives a mapping from a simple, non-repeating input schema node to a simple, non-repeating output node, the statement editor 230 creates a corresponding simple mapping statement. For example, the visual editor 220 may receive a mapping from a node specifying a "name" of a "child" node in the input schema to a "name" of a "student" node in the output schema. The statement editor 230 creates a corresponding simple mapping statement.

A group statement comprises other mapping statements. In other words, the group statement includes multiple mapping statements nested within the group statement. If the visual editor 220 receives from the client application 170, a mapping from a complex single-occurring node of the input schema with a complex single-occurring node of the output schema, the statement editor 230 creates a group statement. The statement editor 230 adds mapping statements in the group statement that map the individual nodes occurring within the complex single-occurring node of the input schema to nodes occurring within the complex single-occurring node of the output schema.

Figure 6A:
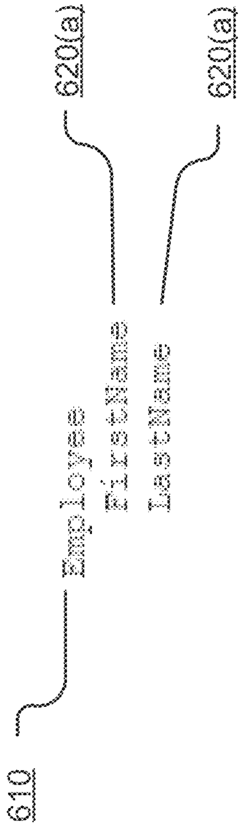
FIG. 6A shows an example of a complex node in a schema, according to an embodiment.
Figure 6B:
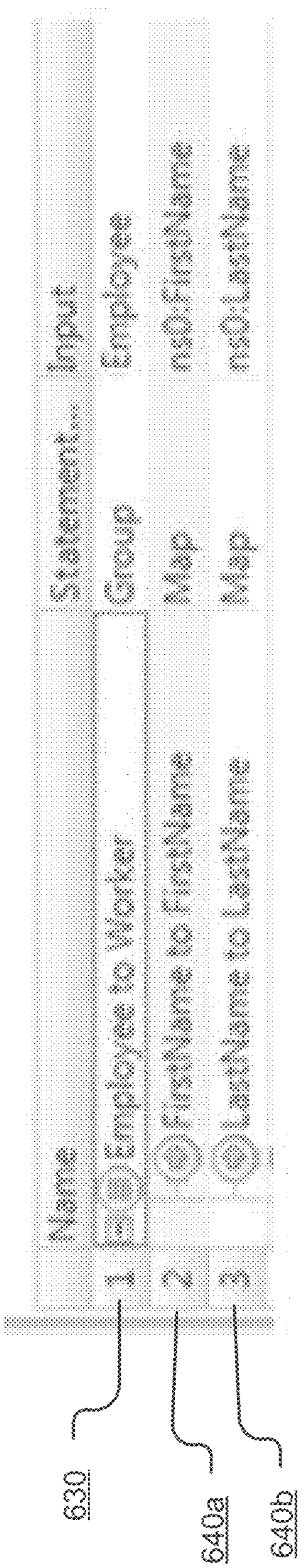
FIG. 6B shows a group statement, mapping the complex node from the input schema shown in FIG. 6A to a complex node from the output schema, in accordance with an embodiment.

FIG. 6A shows a complex node 610 "Employee" that contains two simple nodes "FirstName" and "LastName" representing the first name 620(*a*) and last name 620(*b*) for the "Employee" node. The complex node 610 occurs in the input schema. FIG. 6B shows a group statement, mapping the complex node from the input schema shown in FIG. 6A to a complex node from the output schema, in accordance with an embodiment.

Assume that a complex node "Worker" exists in the output schema and contains nodes "FirstName" and "LastName." If a user associates an "Employee" node with the "Worker" node using the visual editor 220, the statement editor 230 generates and displays a group statement 630. The group statement 630 maps an "Employee" node of the input schema to the "Worker" node of the output schema. The group statement 630 includes two map statements 640*a* and 640*b*. In other words, group statement 630 is a parent node of the child nodes 640*a* and 640*b*. The map statement 640*a* maps the "FirstName" of an "Employee" Node to the "FirstName" of the "Worker" node. The map statement 640*b* maps the "LastName" of an "Employee" node to "LastName" of the corresponding "Worker" node.

A repeating group statement is a group statement that is executed multiple times, for example, for processing nodes of a repeating node. The input to the repeating group statement can be an XPath expression that evaluates to a sequence of nodes. The data processor 130 executes the repeating group statement for each node obtained by evaluating the input XPath expression. If the visual editor 220 receives a mapping from a repeating node of the input schema to a repeating node of the output schema, the statement editor 230 creates a repeating group statement in the script representation. Alternatively, if the statement editor 230 receives the specification of a repeating group statement in the script representation, the visual editor 220 creates a link between the input and output nodes in the visual representation based on the path expressions of the repeating group statement.

A router statement specifies a group of conditions for mapping. A router statement provides alternatives for the mapping logic based on conditions in the input document. The router statement contains one or more option statements and may include one default statement. An option statement specifies a condition. For example, an option statement might contain the condition "EmploycelD=100." When the EmployeeID is 100, the condition is true. If the condition of the option statement is true, one or more statements associated with the option are executed. A default statement is a mapping statement in a router statement that is executed when none of the option statements apply.

When the data processor 130 executes a router statement, the data processor 130 tests each option statement nested below the router statement. The first option statement for which the condition is evaluated to true is performed. The option statement for which the condition evaluates to true is referred to as the option statement that matches an input during execution of the router statement. If none of the option statements match, the default statement is performed. In some embodiments, an option statement may specify an input comprising a path expression that evaluates to one or more nodes. In these embodiments, the data processor 130 performs the first option statement for which the input evaluates to a non-empty node.

Figure 7:
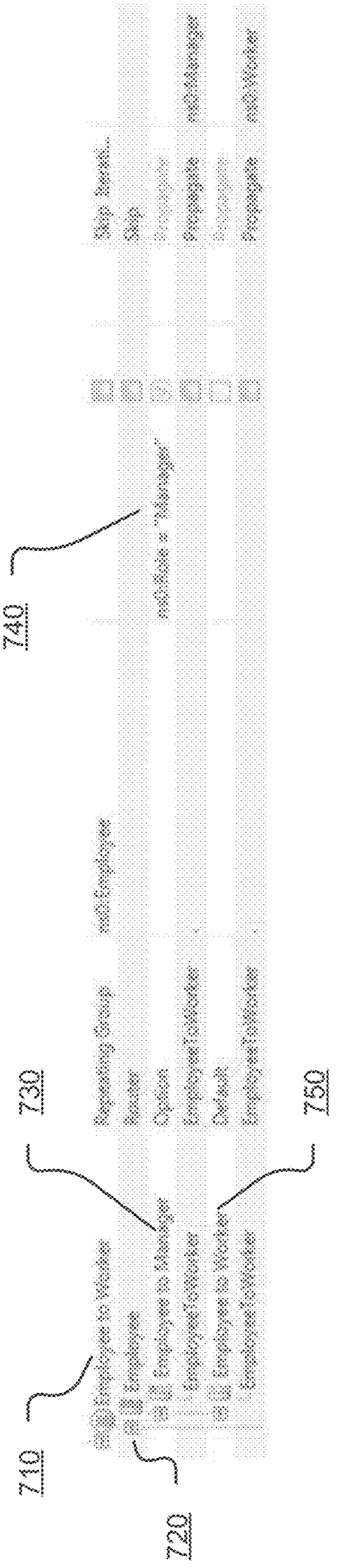
FIG. 7 illustrates a router statement as shown in the grid view, in accordance with an embodiment.

FIG. 7 illustrates a router statement as shown in the grid view, in accordance with an embodiment. As shown in FIG. 7 "Employee to Worker" is a repeating group statement 710. This statement is executed for each Employee node of an input XML document to generate a "Worker" node for the output XML document. The first child statement in the "Employee to Worker" repeating group statement is a router statement 720 "Employee." The router statement has one option statement 730. The option statement 730 has a condition 740 that checks if the value of "Role" is equal to the value of "Manager." If the value of "Role" equals "Manager," the option is true. The data processor 130 executes the "EmployeeToWorker" statement to map the "Employee" node to "Manager." In an embodiment, a condition of an option statement is associated with an expression that is evaluated and used for determining an output node if the condition evaluates to true. If the value of "Role" is not equal to "Manager," the default statement 750 is executed. The default mapping statement results in execution of "EmployeeToWorker" mapping statement to map an input "Employee" node to "Worker."

In an embodiment, a mapping statement specifies a mode that determines how the data processor 130 processes the output of the mapping statement. The data processor 130 evaluates a path expression specifying the output in the mapping statement. One mode of the mapping statement specifies that if one or more nodes are found in the output hierarchical data structure corresponding to the output path expression, the data processor 130 updates the nodes found based on the result of evaluation of the mapping statement. Another mode specifies that if one or more nodes are found in the output hierarchical data structure corresponding to the output path expression, the data processor 130 reports an error. For either of these modes, if no nodes are found corresponding to the output path expression of the mapping statement, the data processor 130 creates a new node based on the result of evaluation of the mapping statement.

The mode value may be represented as a string. For example, if the mode is specified as "add," the data processor 130 creates a new node in the output document if there is no corresponding output node. According to this mode, if the node exists in the output, the data processor 130 returns an error as a result of executing the mapping statement. If the mode is specified as "match," the data processor 130 returns an error as a result of executing the mapping statement if a matching node does not exist in the output. If the mode is specified as "match or add," the data processor 130 checks if a matching node exists in the output document. If a matching node exists in the output then the data processor 130 updates it. If the matching node does not exist in the output document, the data processor 130 creates a new node.

Overall Process

Figure 3:
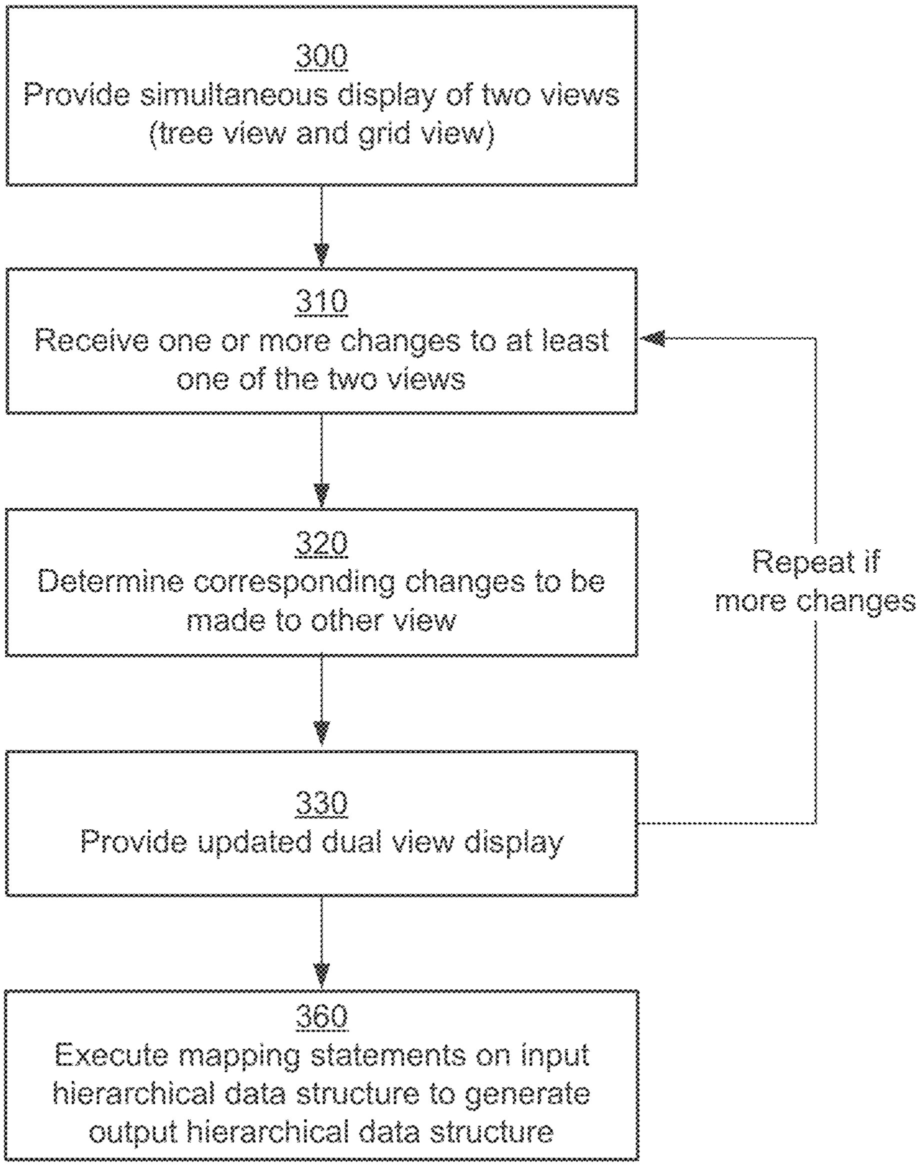
FIG. 3 shows a flowchart illustrating the process for defining a mapping from an input schema to an output schema and using the mapping to generate a hierarchical data structure, in accordance with an embodiment of the invention.

FIG. 3 shows a flowchart illustrating a process for defining a mapping from an input schema to an output schema and using the mapping to generate a hierarchical data structure, in accordance with an embodiment of the invention. The steps described herein may be performed by modules different from those indicated herein. The steps may be performed in different order than described herein. Certain steps may be performed concurrently.

Figure 5:
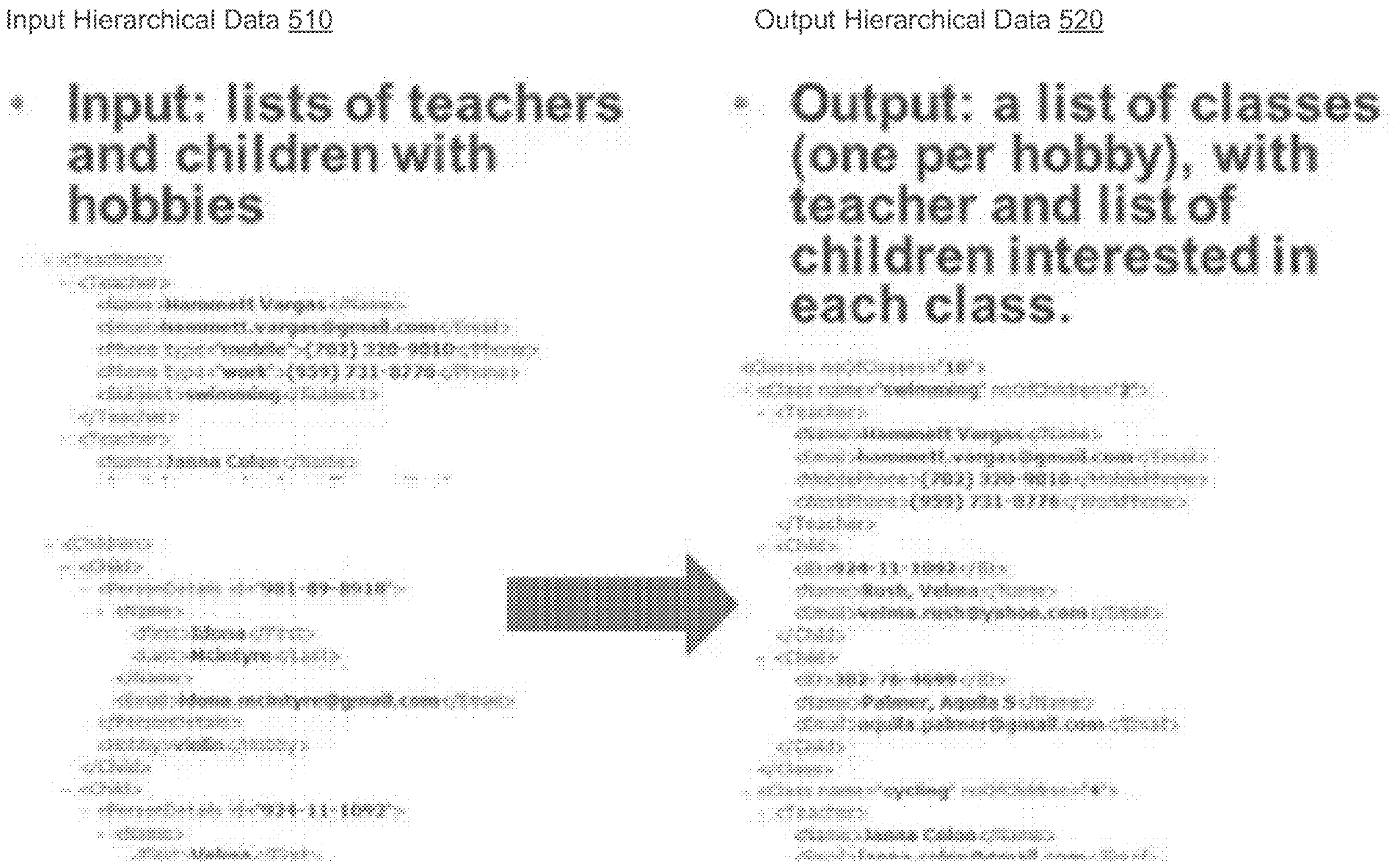
FIG. 5 shows an example input hierarchical data structure and an output hierarchical data structure that is generated using a mapping from the schema of the input hierarchical data structure to the schema of the output hierarchical data structure, according to an embodiment.

As a preliminary step, the mapping system 100 receives an input schema comprising metadata describing an input hierarchical data structure and an output schema comprising metadata describing an output hierarchical data structure. Referring briefly to FIG. 5, it shows an example input hierarchical data 510 structure and an output hierarchical data structure 520 that is generated by the mapping system 100 using a mapping from the schema of the input hierarchical data structure to the schema of the output hierarchical data structure, according to an embodiment. The input hierarchical data structure 510 represents a list of teachers and a list of children. Each teacher in the list of teachers has a name, email, one or more phone numbers, and a subject. Each child in the student list has a node "Hobby" and a node "PersonDetails" specifying personal details including a name and an email. The name of the child includes a "First" and a "Last" value representing the first name and the last name. The output hierarchical data 520 represents a list of classes, each class corresponding to a hobby of a child. Each "Class" node has a "Teacher" node and multiple "Child" nodes. The "Class" node includes attributes "name" and "noOfChildren."

Referring back to FIG. 3, the method begins by providing for simultaneous display 300 a visual representation of a mapping between input and output schemas, e.g., corresponding to the input hierarchical data 510 and output hierarchical data 520 of FIG. 5. Upon receiving user input, the mapping system 100 loads or defines input schema and output schema for a new mapping between nodes of the input and output schema. Alternatively, the mapping system 100 may receive a request to load a previously saved project for further modification. The displaying may occur in a user interface of a client application 170 on the client device 120.

Figure 4:
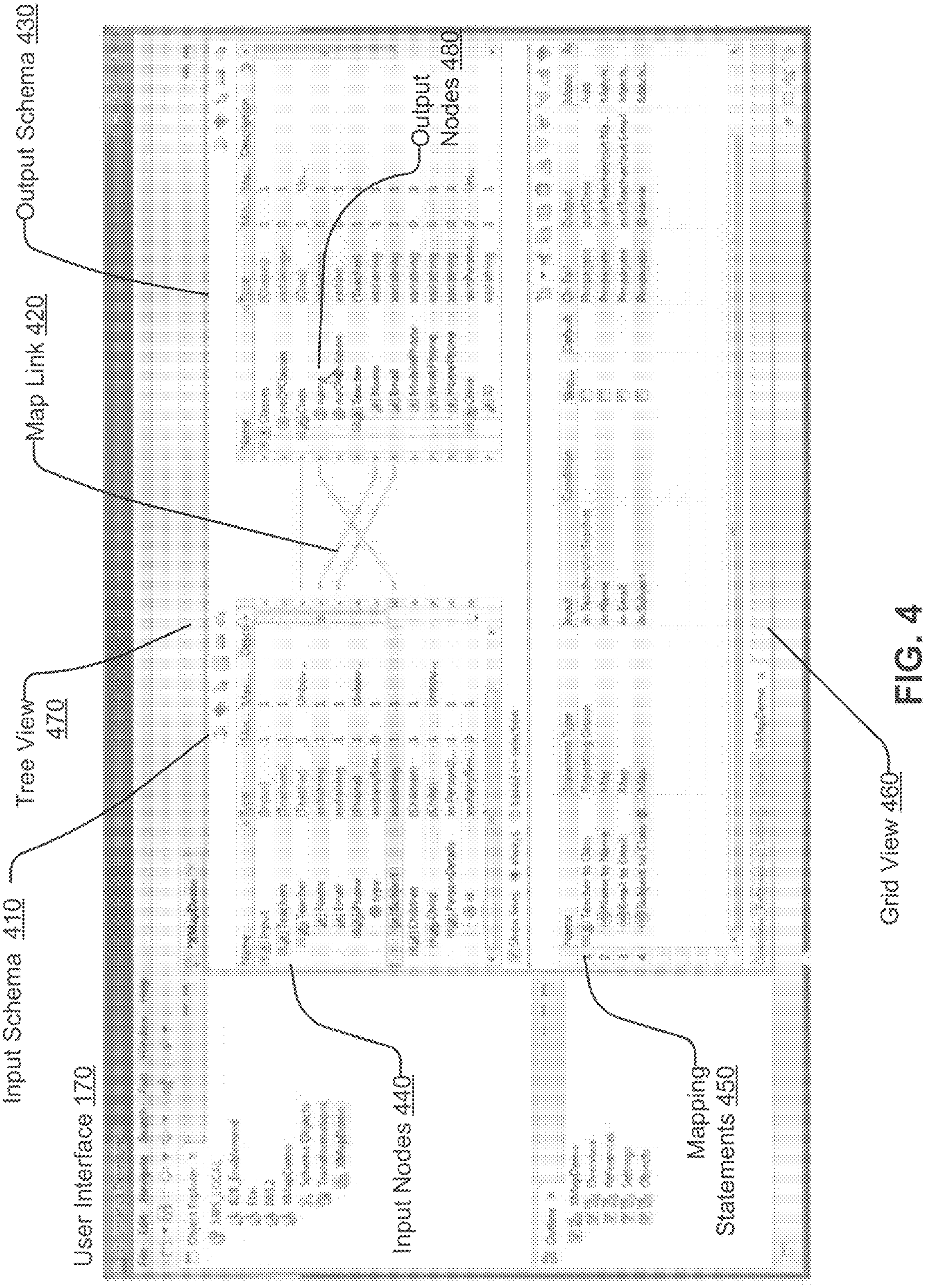
FIG. 4 shows a screenshot of a user interface of the client application that allows a user to map an input schema to an output schema, according to an embodiment.

Referring to FIG. 4, an example user interface is shown displaying the mapping of input schema 410 to output schema 430. The top portion of the UI displays a visual representation, shown as tree view 470. The tree view 470 displays a visual representation of the input schema 410 and a visual representation of the output schema 430. Child nodes 440*b* of a parent node 440*a* are displayed as indented compared to the parent node 440*a*. Information describing each node 440 is presented, for example, a type of the node, minimum and maximum cardinality values for the node, and so on. In the tree view 470, input nodes 440 in the input schema 410 are mapped via map links 420 to output nodes 480 in the output schema 430. A map link 420 may also associate a set of input nodes 440 from the input schema 410 with a set of output nodes 480 of the output schema 430. Map links 420, when created, cause mapping statements 450 to populate in the grid view 460.

Figure 8A:
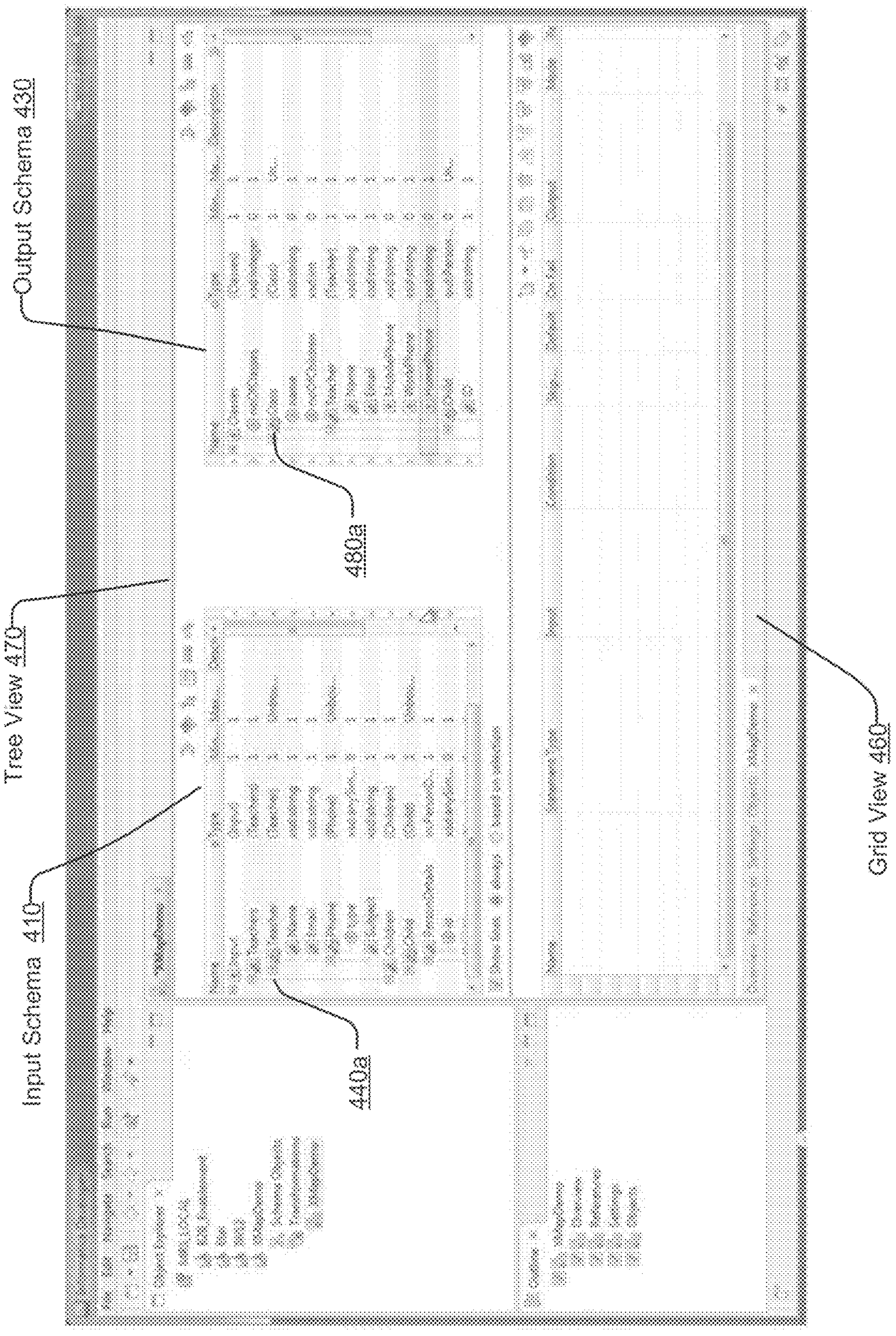
FIG. 8A shows a screenshot of the user interface presenting the input schema and output schema in the tree view, according to an embodiment.

The bottom portion of the user interface displays a script representation, shown as the grid view 460. The grid view 460 is made up of mapping statements 450 and corresponding information about the mapping statements 450, for example, a type of the mapping statement 450, e.g., the input and output nodes of the statement, a condition associated with the mapping, if any, and so on. If no map links 420 or mapping statements 450 have been made for the input and output schema 410, 430, the user interface would be "blank," i.e., showing no map links 420 or mapping statements 450, as shown in FIG. 8A.

Referring back to FIG. 3, the mapping system 100 receives 310 user input indicating a change to one view (either the tree view 470 or the grid view 460) of the mapping. For example, user input on the user interface of FIG. 4 may specify a new association between a node from the input schema 410 with a node of the output schema 430, causing a new map link 420 to display in the tree view 470. Alternatively, user input may specify a change to a mapping statement 450 in the grid view 460. As changes are made 310 to the user interface, information about the changes is passed to the mapping system 100, e.g., the visual editor 220 receives the information and provides information describing the modifications to the statement editor 230. Changes that can be made to the tree view 470 include associating nodes from input schema to output schema and to the grid view 460 include adding mapping statements, defining expressions, and validating expressions. These are illustrated through FIGS. 8A-8K.

Since changes in one view are reflected in the other view, the mapping system 100 determines 320 corresponding modifications to the unmodified view. For example, if the visual editor 220 receives information about a new association between a node from the input schema with a node of the output schema in the tree view 470 of FIG. 4 per step 310 above, the statement editor 230 generates a new mapping statement for the grid view 460 corresponding to the association created, passes it to the visual editor 220, and provides 330 the mapping statement for display to the user via the user interface. Likewise, a change to a mapping statement of the grid view 460 of FIG. 4 per step 310 would trigger an update to the corresponding mapping in the tree view.

If the user is done making edits, the user can execute 360 the mapping statements, e.g., by selection of a control on the user interface for executing the displayed statements. For execution, the data processor 130 receives input identifying an input hierarchical data structure to process. The data processor 130 executes 360 the mapping statements for the input hierarchical data structure and generates the corresponding output hierarchical data structure. Alternatively, further modifications to the mapping would cause steps 310, 320, 330 to repeat.

The steps of the process illustrated by FIG. 3 may be performed in an order different from the order shown in FIG. 3. For example, the user may perform edits in different orders than those indicated, or may perform a series of edits.

Examples Illustrating Use of Editor

FIGS. 8A-8K illustrate how the client application 170 can be used for mapping an input schema to an output schema. The XML schemas 510, 520 used in this example are those shown in FIG. 5. Accordingly, the input schema specifies a list of teachers and a list of children, where each child has listed one or more hobbies. The output schema specifies a list of classes of students, each class having a teacher and a list of children who are enrolled in the class.

FIG. 8A shows a screenshot of the client application 170 presenting the input schema 410 and output schema 430 in the tree view 470, according to an embodiment. FIG. 8A is an example of the user interface shown in FIG. 4. The tree view 470 shows the input schema 410 and the output schema 430 with their respective nodes 440, 480. The grid view 460 is empty.

Figure 8B:
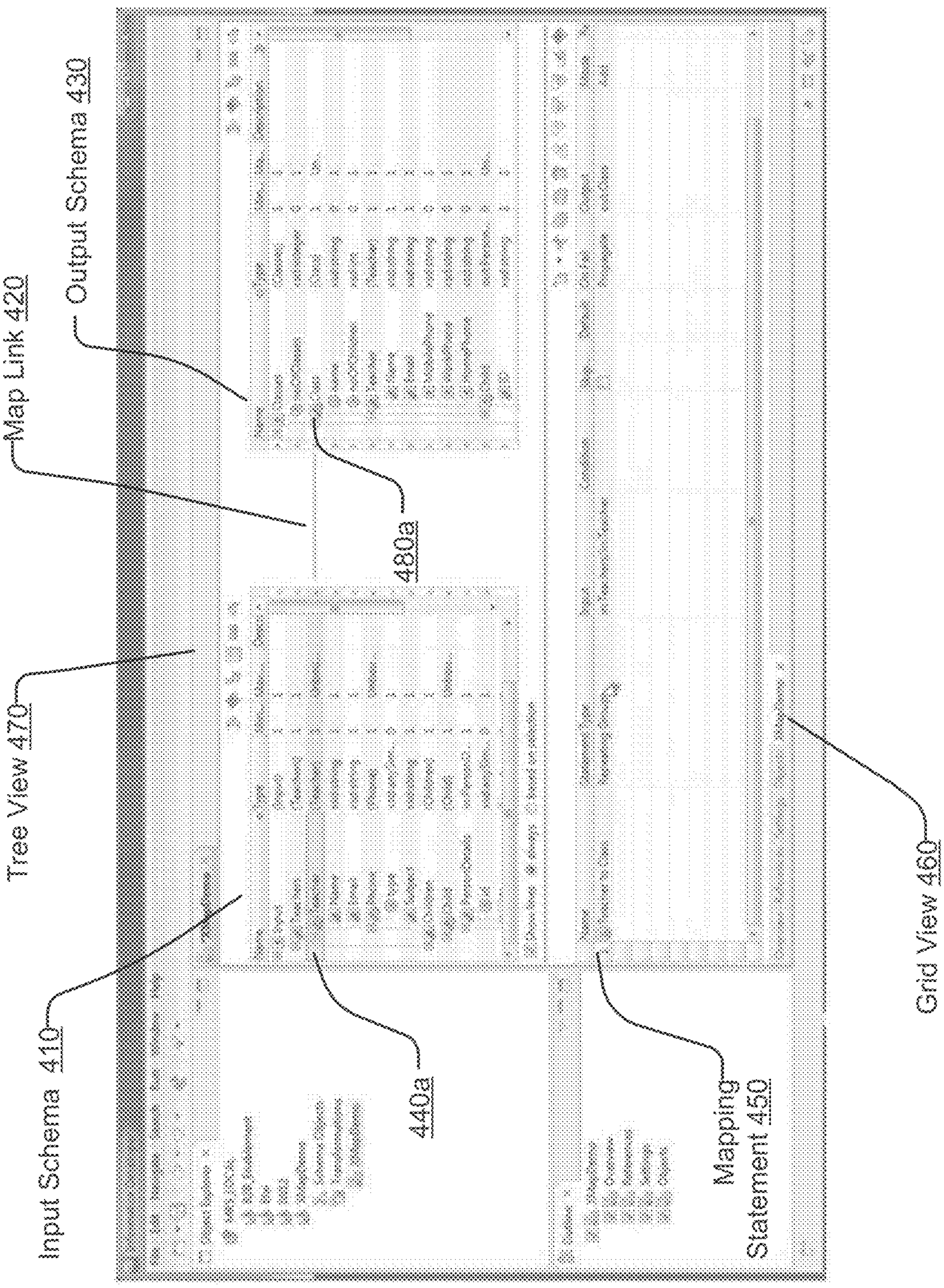
FIG. 8B shows a screenshot of the user interface illustrating a mapping from a node from the input schema to a node from the output schema, according to an embodiment.

FIG. 8B shows a screenshot of the client application 170 illustrating a mapping from a node 440*a* from the input schema 410 to a node 480*a* from the output schema 430, according to an embodiment. The client application 170 receives input from the user via the tree view 470 specifying the mapping of the input schema 410 to the output schema 430, for example, by dragging and dropping nodes from input to output. This mapping is an example of step 310 of FIG. 3, receiving one or more changes to at least one of the two views. The use of the tree view 470 enables a user to quickly and visually create the overall structure of the mapping.

Responsive to an input received via the tree view 470 of the client application 170, for example, a drag and drop operation, a new mapping statement 450 is displayed in the grid view 460. As noted in FIG. 3, the mapping system 100 determines 320 the corresponding change(s) to be made to the other view (in this case the grid view), and provides 330 an update to the dual display.

Figure 8C:
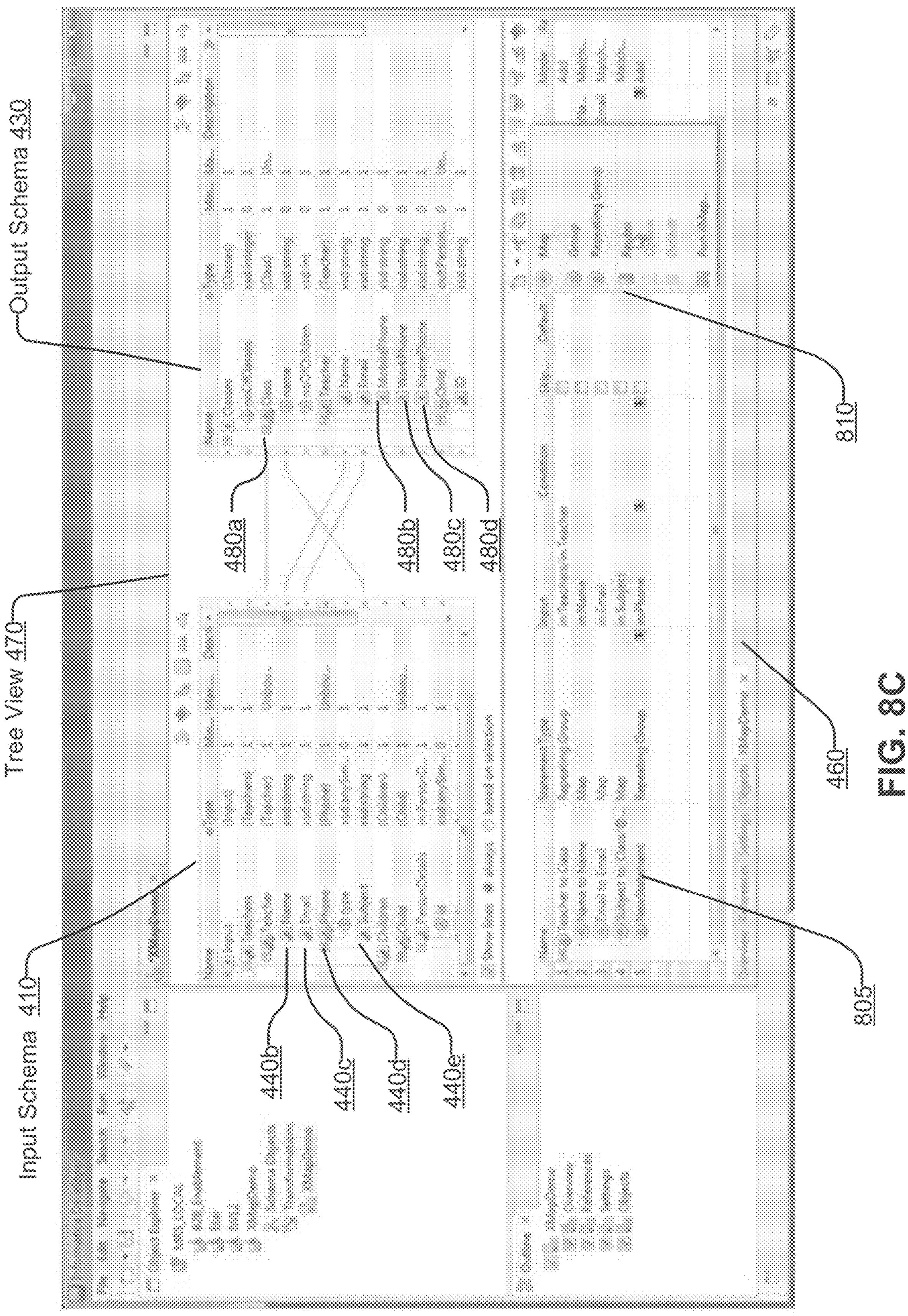
FIG. 8C shows a screenshot of the user interface after user maps several nodes from the input schema to corresponding nodes from the output schema, according to an embodiment.

FIG. 8C shows a screenshot of the client application 170 after the client application 170 receives inputs mapping several nodes 440 from the input schema 410 to corresponding nodes 480 from the output schema 430. As shown in FIG. 8C, the teacher name 440*b*, email 440*c* and the subject 440*e* from the input are mapped the nodes of the "Teacher" node within a "Class" node 480*a*. If the user wants to map the teacher's phone numbers, the input schema 410 has a repeating node phone 440*d* with the type attributes, but the output schema 430 has three distinct nodes for each phone type, "MobilePhone" node 480*b*, "WorkPhone" node 480*c*, and "HomePhone" node 480*d*. The phone node 440*d* is mapped to the output nodes 480*b*, 480*c*, and 480*d* using a repeating group statement 805. The client application 170 displays a dropdown list 810 to the user for inserting a router statement to map the phone node from the input. The drop down list 810 may be displayed in response to the grid view 460 receiving user input indicating the user wants to insert a new statement. This is another example of receiving 310 a change in one view (in this case, the grid view 460), and after determining 320 the corresponding changes in the other view (tree view 470), updating 330 the display to reflect the changes.

Figure 8D:
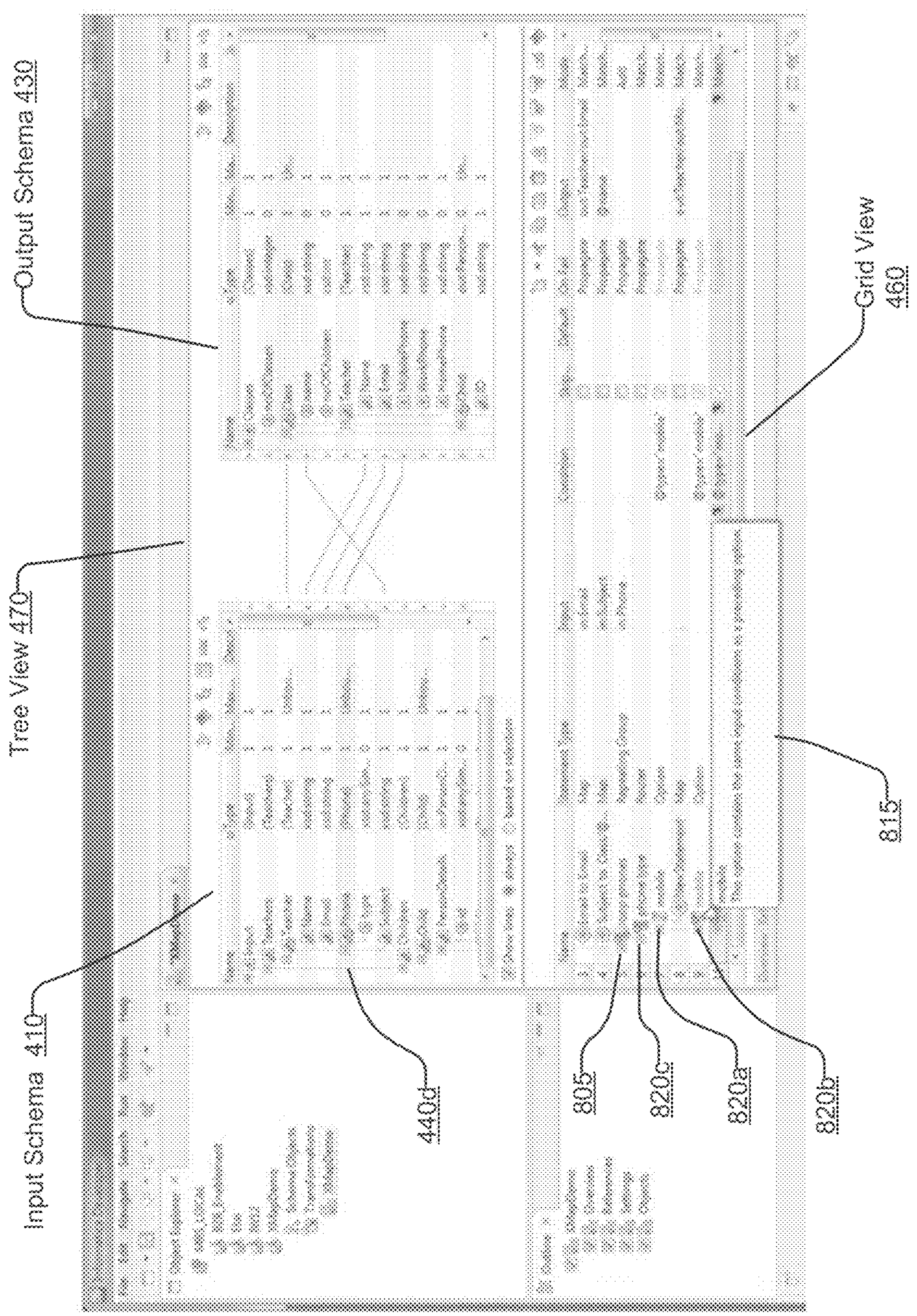
FIG. 8D shows a screenshot of the client application showing a router statement, according to an embodiment.

FIG. 8D shows a screenshot of the client application 170 showing a router statement 820*c*, according to an embodiment. The condition for the first option 820*a* of the router statement is "type equals mobile." The semantics of the router statement 820*c* is explained by describing how the data processor 130 executes the statement. When the data processor 130 executes the repeating group statement 805 for a repeating node 440*d* of the phones in the input XML document, if a node of type "mobile" is encountered, the node is mapped to the "MobilePhone" node 480*b* in the output XML document. Similarly, if a node of type "work" is encountered, the node is mapped to the "WorkPhone" node 480*c* in the output XML document and if a node of type "home" is encountered, the node is mapped to the "HomePhone" node 480*d* in the output XML document. The user can also go back and rename the statements for clarity. For example, the user may call the repeating group statement 805 "loop phones."

FIG. 8D also shows an error 815 displayed by the client application 170 during the mapping performed by the user. If the user wants to define options to handle the work and home phone numbers, the user can do this by copy/pasting the mobile phone option 820*a* statement additional times into the router, for example, by adding the option 820*b*. The statement editor 230 visually indicates an error 815 showing that the new option 820*b* is invalid because the conditions of options 820*a* and 820*b* are not unique. The error 815 is shown by the client application 170 by displaying the node corresponding to the error 815 in a manner that visually distinguishes the node from other nodes, for example, using a font that is distinct from the other text in the grid view 460. The user can fix the conditions in these two option statements by changing the expressions to test for the values "work" and "home." FIG. 10 described below discusses further details of error reported by the grid view 460.

Figure 8E:
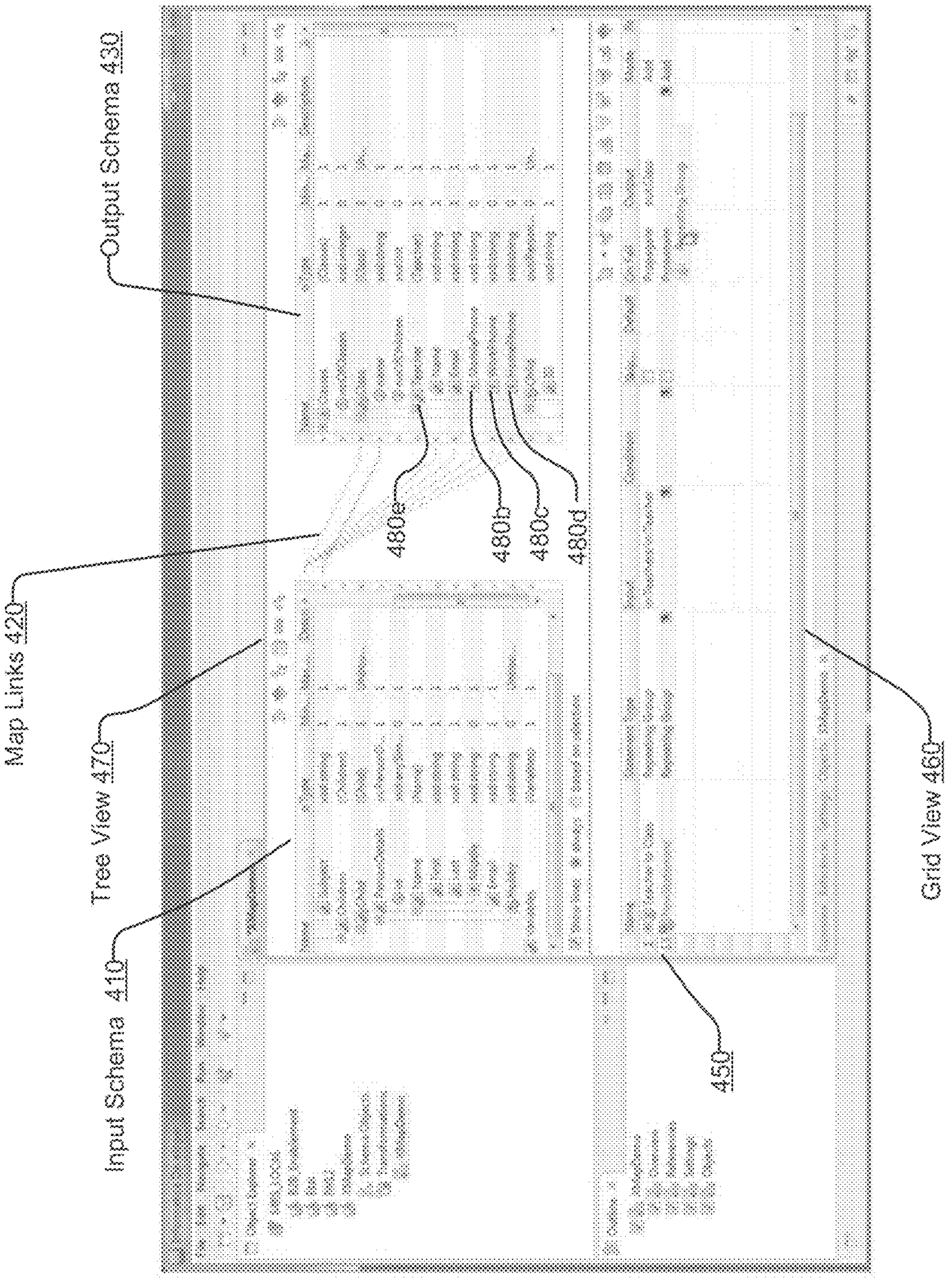
FIG. 8E shows a screenshot of the user interface illustrating mapping links updated to reflect changes to the mapping statements in the grid view, according to an embodiment.

FIG. 8E shows a screenshot of the client application 170 illustrating the map links 420 updated to reflect changes to the mapping statements 450 in the grid view 460, according to an embodiment. As shown in FIG. 8E, the map links 420 are displayed in the tree view 470. The map links 420 show that nodes MobilePhone 480*b*, WorkPhone 480*c*, and HomePhone 480*d* of a Teacher node 480*e* of a class in the output schema 430 all are obtained from the input repeating node Phone 440*d* of the input schema 410.

Figure 8F:
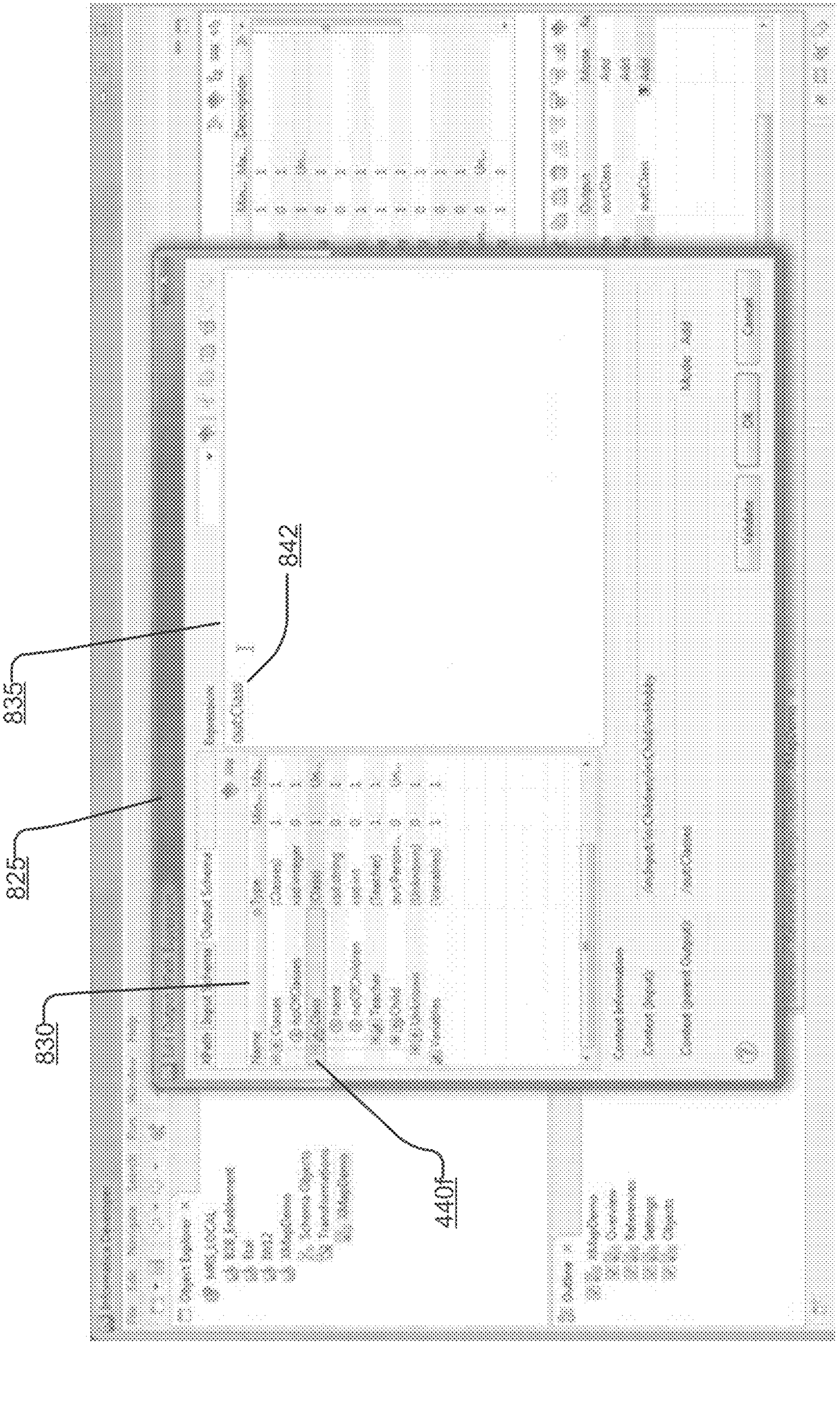
FIG. 8F shows a screenshot of the user interface illustrating the expression editor, according to an embodiment.

FIG. 8F shows a screenshot of an expression editor user interface 825, according to an embodiment. The expression editor UI 825 can be used for creating and testing XPath expressions. The expression editor UI 825 shows an expression editing panel 835 that is used by a user to build and view the expression in text form. The expression editor UI 825 also includes a panel 830 showing tabs used by a user for building an expression. As shown in FIG. 8F, expression editor UI 825 receives input from the user adding a node 440*f* corresponding to "Class" to the expression. The expression editor UI 835 indicates that the node "class" added to the expression is from the output schema by prefixing the expression with "out:" to display the node as "out:Class" 842 in the expression editing panel 835.

Figure 8G:
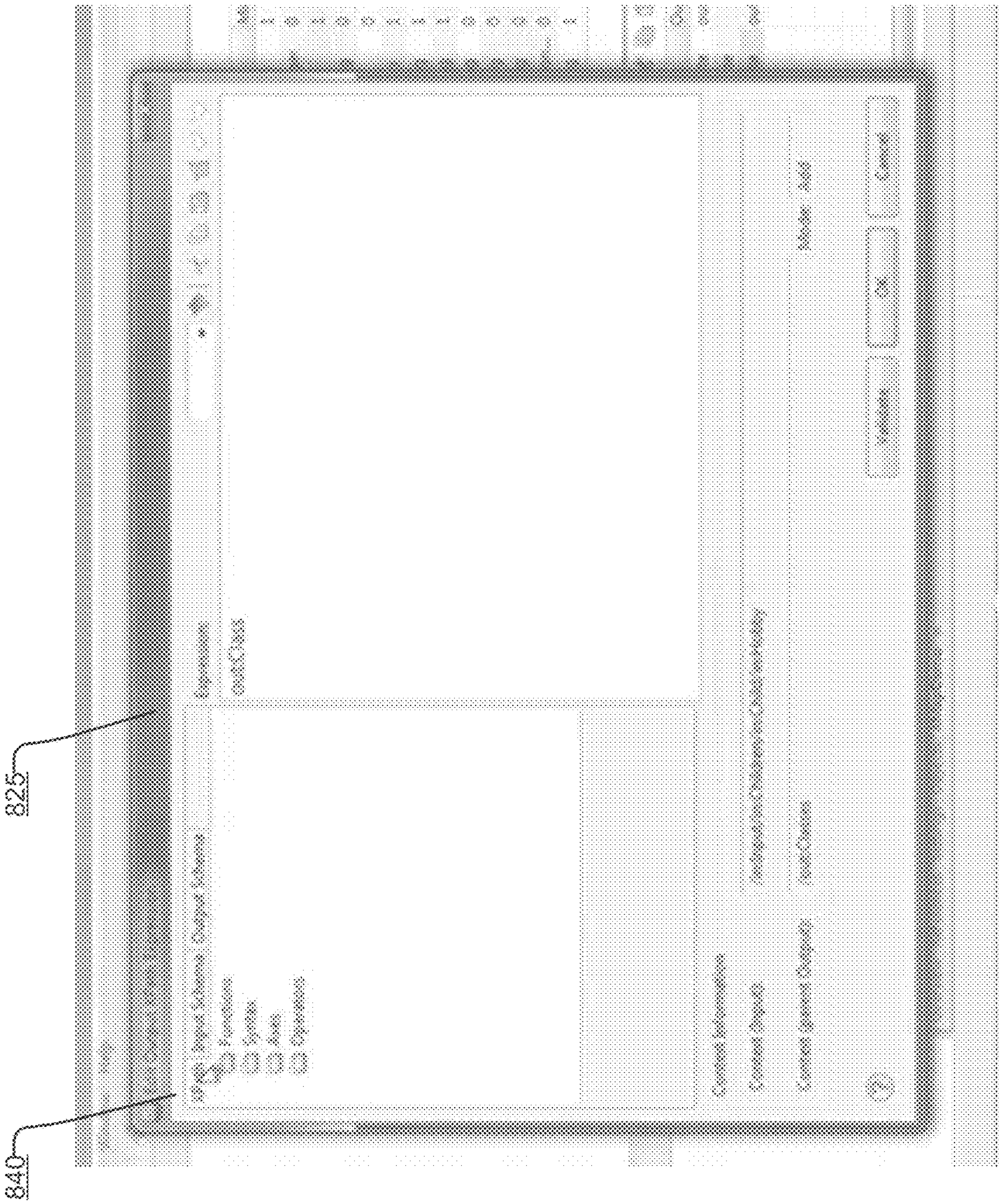
FIG. 8G shows a screenshot of the user interface of the expression editor for specifying a path expression using the expression editor, according to an embodiment.

FIG. 8G shows a screenshot of the expression editor UI 825 for specifying a path expression using the expression editor 240, according to an embodiment. The expression editor UI 825 shows an XPath tab 840 displaying functions for building expressions using the expression editor 240. The XPath tab 840 presents the different functions and operators supported by the XPath language or any other expression language supported by the expression editor 240. If expression editor UI 825 receives a selection of a function or operator using XPath tab 840, the expression editor UI 825 shows the selected function or operator the expression editing portion 835.

Figure 8H:
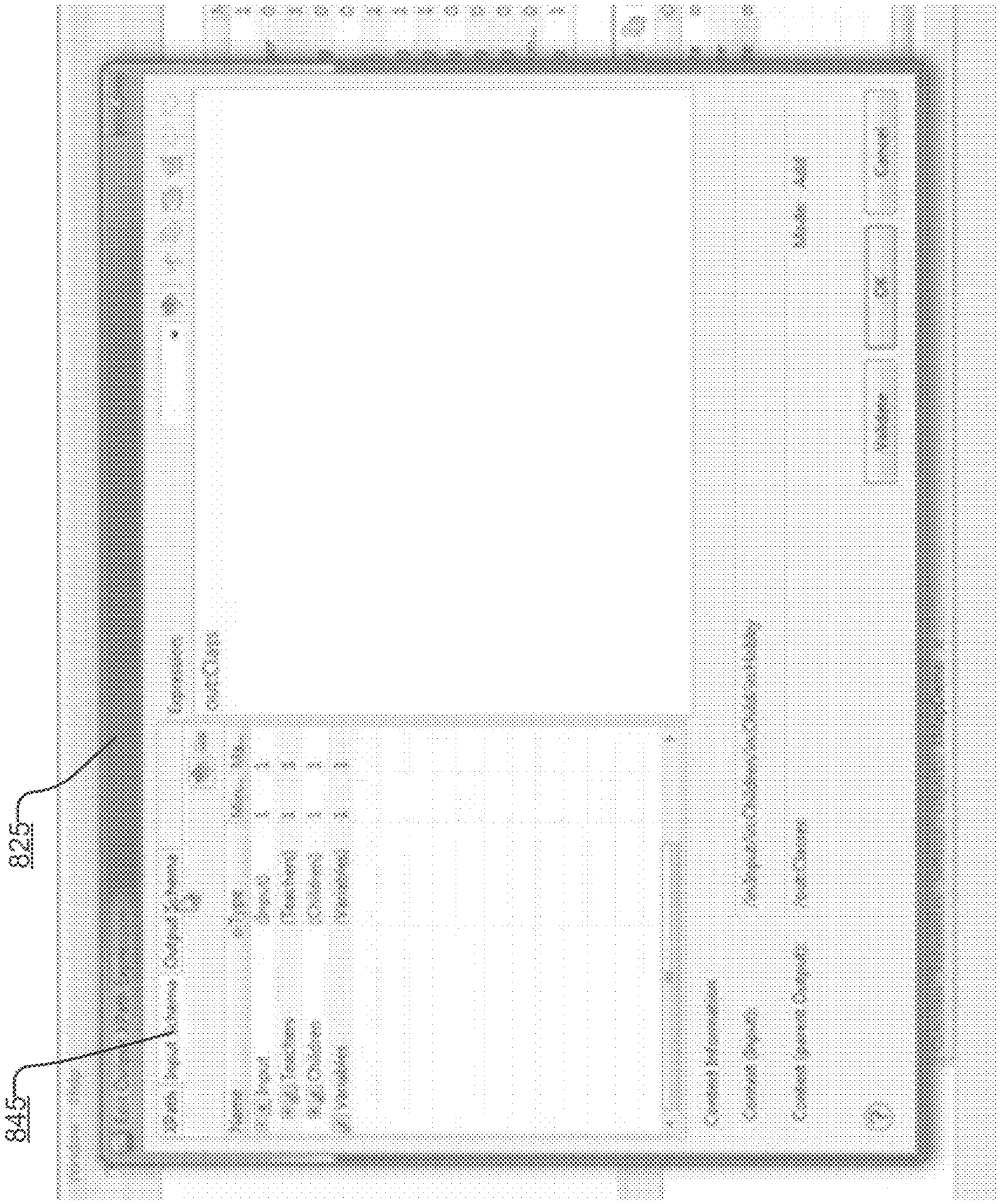
FIG. 8H shows a screenshot of the user interface allowing the user to select nodes of the input schema using the expression editor, according to an embodiment.

FIG. 8H shows a screenshot of the expression editor UI 825 allowing the user to select nodes of the input schema using the expression editor 240, according to an embodiment. The input schema tab 845 shows nodes from the input schema for including in an expression. When the expression editor UI 825 receives a selection of a node from the input schema or the output schema for use in an expression, the expression editor 240 determines the path of the selected node and displays the path of the node in the expression being built. For example, a user can build an expression that concatenates two or more strings from input to generate an output string.

Figure 8I:
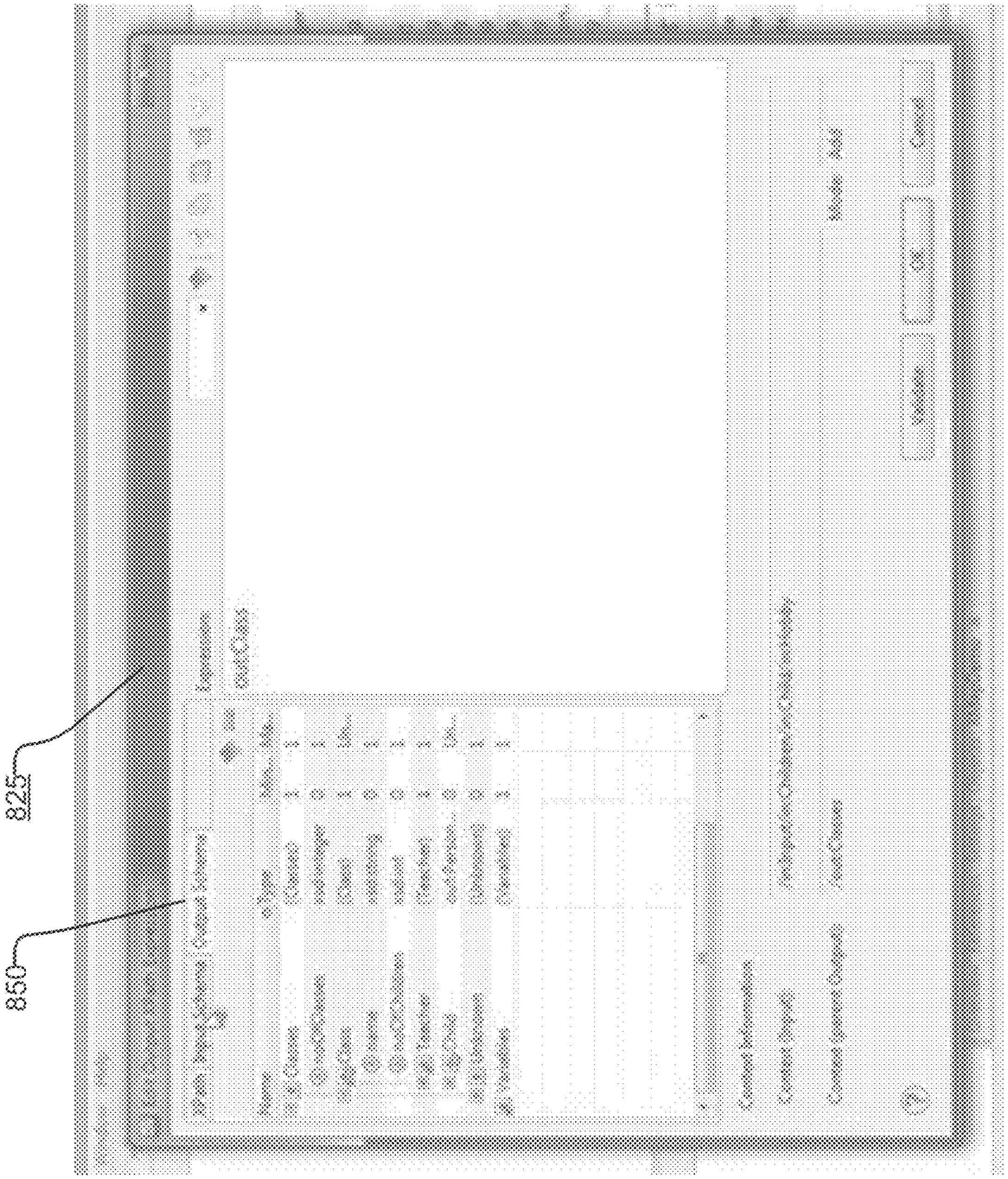
FIG. 8I shows a screenshot of the user interface of the expression editor presenting the nodes of the output schema for selection by a user, according to an embodiment.

FIG. 8I shows a screenshot of the user interface of the expression editor UI 825 presenting the nodes of the output schema for selection by a user, according to an embodiment. The output schema tab 850 shows nodes from the output schema for use in a mapping statement. When expression editor UI 825 receives a selection of a node from the output schema, the expression editor UI 825 provides the selected node to the expression editor 240. The expression editor 240 determines a path expression for the selected node and uses the path expression for specifying the output for the mapping statement.

Figure 8J:
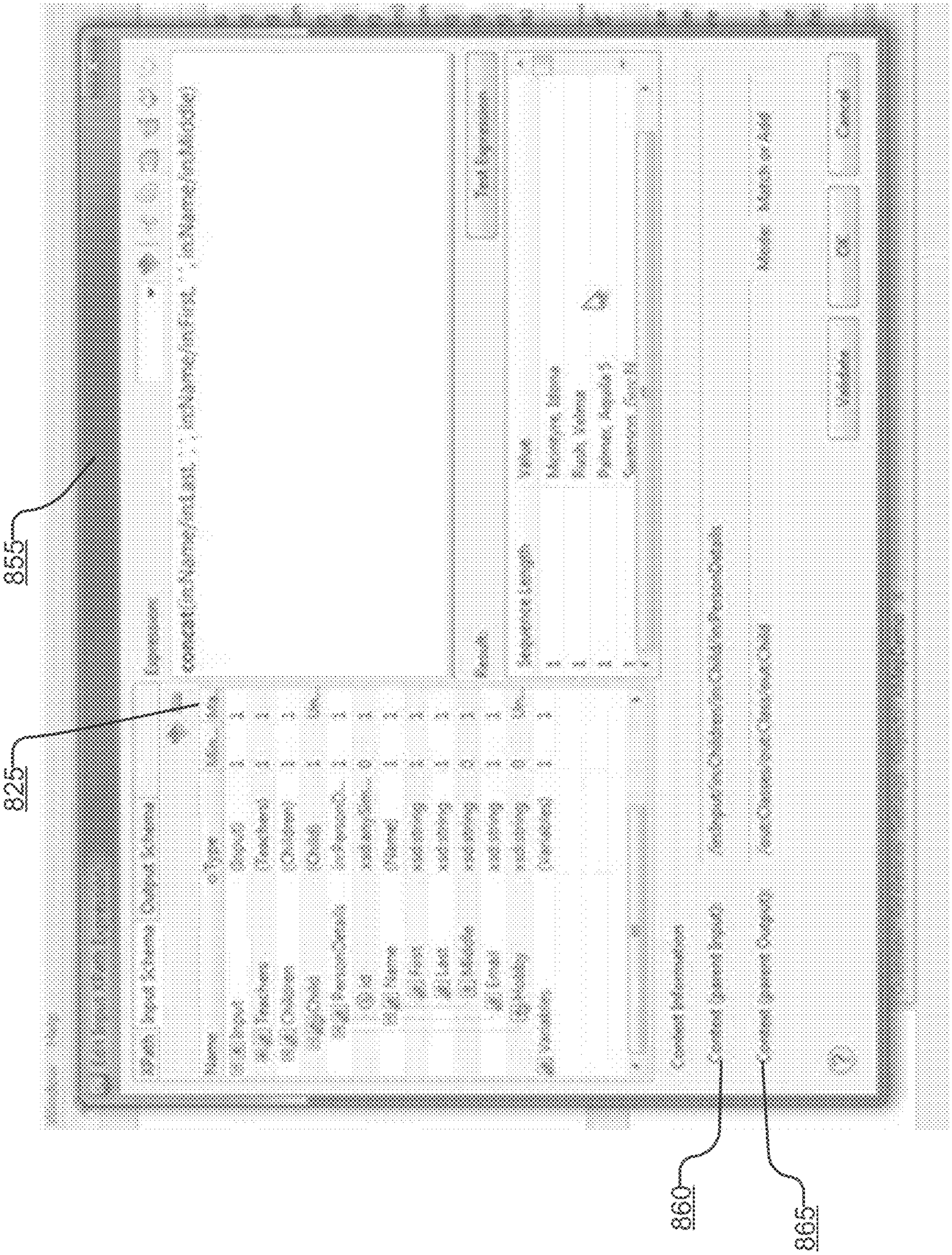
FIG. 8J shows a screenshot of the user interface showing an example expression built using the expression editor, according to an embodiment.

FIG. 8J shows a screenshot of the expression editor UI 825 illustrating an example expression, according to an embodiment. As shown in FIG. 8J, expression 855 concatenates the "First," "Last," and "Middle" nodes from the "Name" node of the input schema. The expression editor UI 825 shows the input context 860 and the output context 865 for the expression 855. The input context 860 corresponds to a node of the input schema and all XPath expressions based on the input schema are specified with respect to the input context. Similarly, the output context 865 corresponds to a node of the output schema and all XPath expressions based on the output schema are specified with respect to the output context. As shown in FIG. 83, the input context node corresponds to the "PersonDetails" node within a "Child" node of the input schema. The nodes "Name" and "Last" are specified as "in:Name" and "in:Last" respectively to indicate that these nodes correspond to the input. The node "Last" is referred to as "in:Name/in:Last" since the node "Last" is within the node "Name."

Figure 8K:
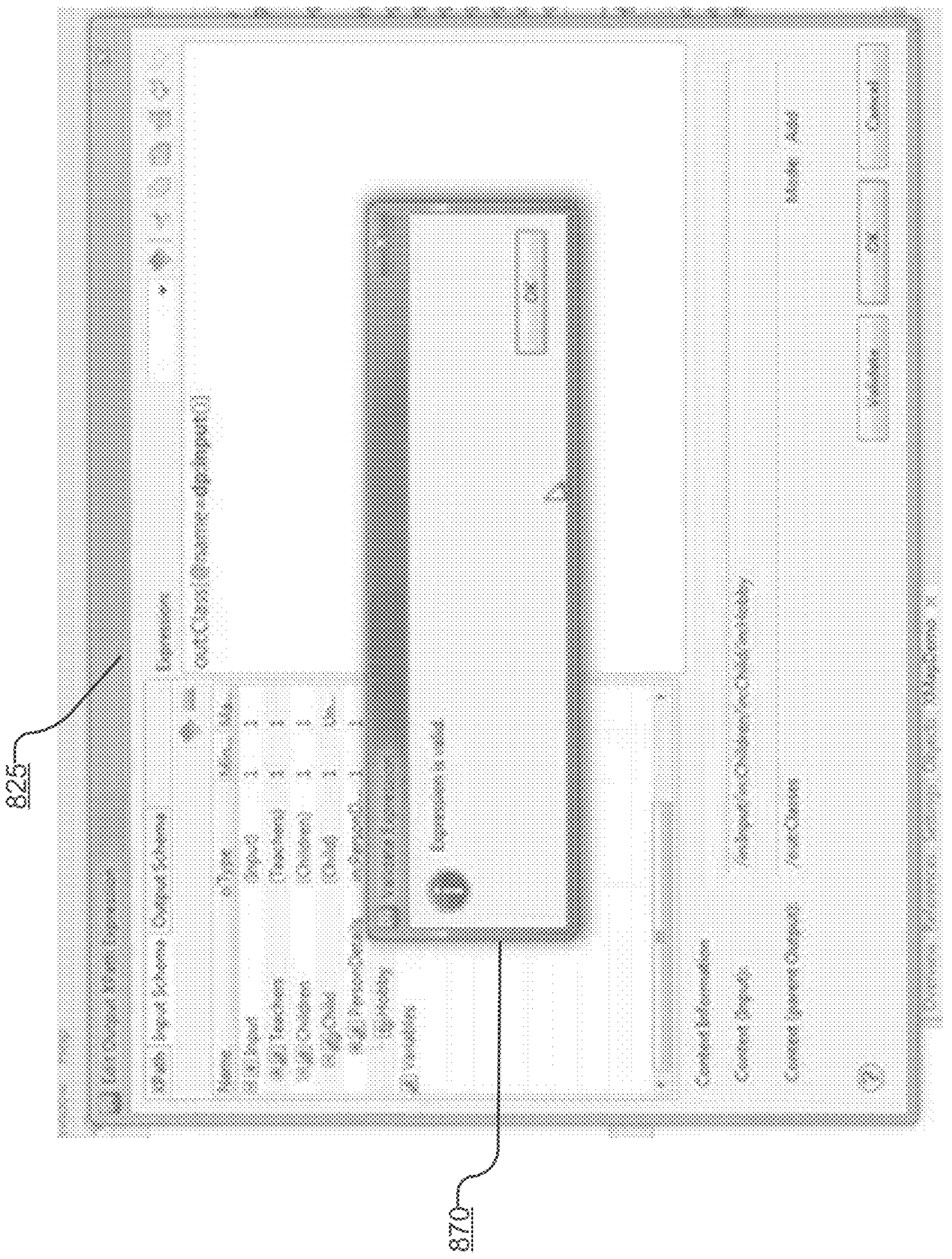
FIG. 8K shows a screenshot of the user interface showing a message displayed as a result of validating an expression, according to an embodiment.

The expression editor 240 validates an expression specified by the user. FIG. 8K shows a screenshot of the user interface showing a message 870 displayed as a result of validation of an expression, according to an embodiment. To validate an expression, the expression editor 240 performs syntactic checks on the expression and also verifies that all nodes used in the expression refer to valid nodes in either the input or output schema. If the expression shown in the expression editor 240 is determined to be invalid, the expression editor UI 825 shows an error message.

Figure 9:
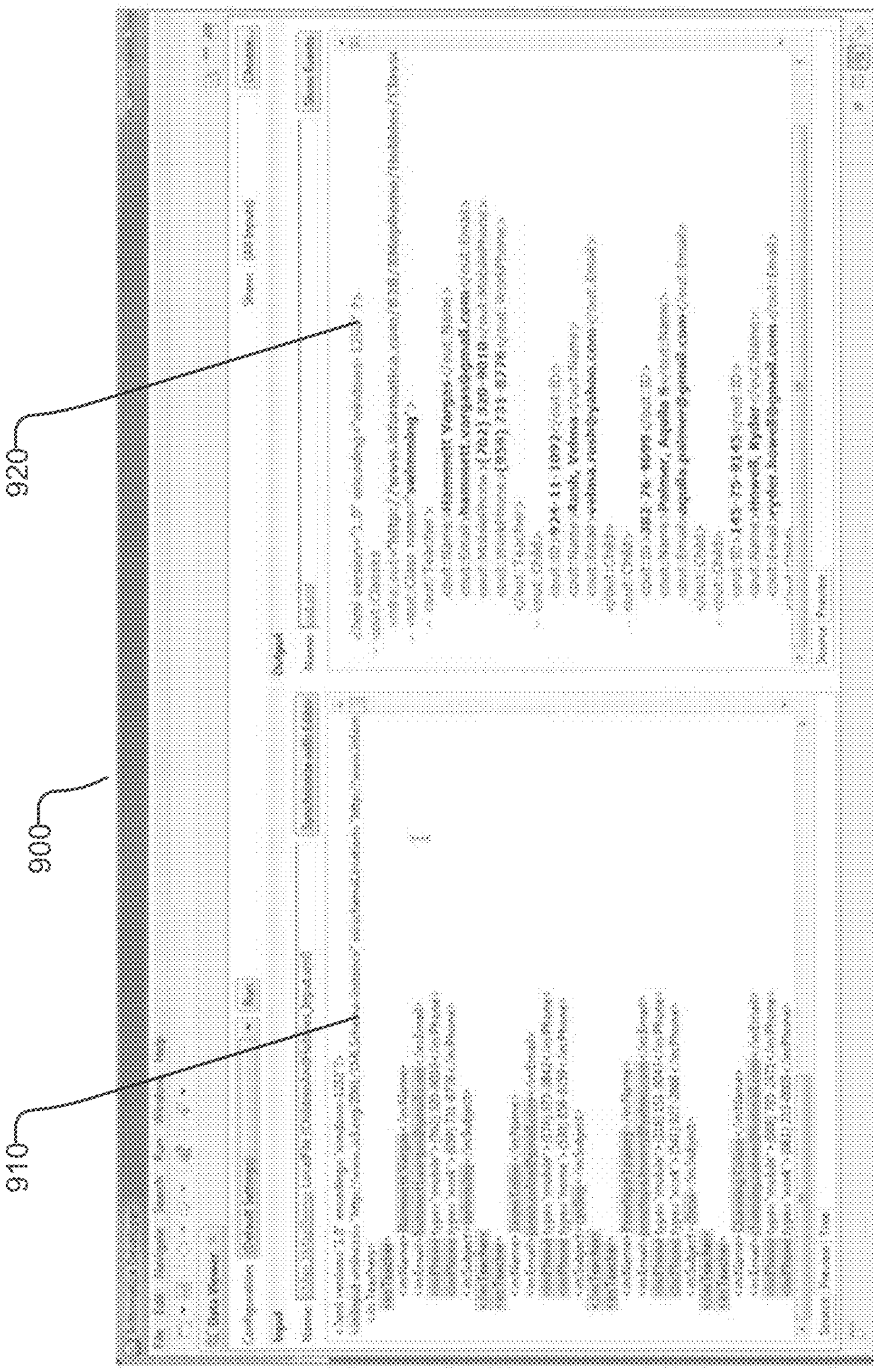
FIG. 9 shows a screenshot of the user interface showing the result of execution of a mapping for an input XML document, according to an embodiment.

Once the user has completed building the desired mapping, the user can run the mapping for an input XML document and see the output that is produced. FIG. 9 shows a screenshot of a user interface 900 showing the result of execution of a mapping defined using the user interface shown in FIG. 4 by performing steps illustrated in FIGS. 8A-8K, according to an embodiment. As shown in FIG. 9, user interface 900 shows the input XML document 910 on the left and the output XML document 920 generated as a result of execution on the right. The generated output XML document 920 shows a class for swimming with a teacher and a list of children who are enrolled in that class. The output XML document 920 also shows a class for cycling with its teacher and its list of children.

Validating Modifications to Mapping Statements

The statement editor 230 is configured to receive inputs specifying mapping statements from the user. A user can add or modify individual mapping statements as well as modify locations of the mapping statements in the hierarchy. There are different ways in which the statement editor can receive input modifying mapping statements and their organization as a hierarchy. The statement editor 230 is configured to receive from the client application 170 a copy-and-paste operation on a mapping statement that copies the mapping statement from a source location in the hierarchy and inserts it in a target location in the hierarchy. The statement editor 230 is also configured to receive from the client application 170 a cut-and-paste operation. The statement editor 230 performs the cut-and-paste operation by copying the mapping statement from a source location in the hierarchy, inserting it in a target location in the hierarchy, and deleting the mapping statement from the source location.

The statement editor 230 is also configured to receive from the client application 170 information describing input indicating promotion of a mapping statement in the hierarchy. The statement editor 230 promotes a mapping statement by moving the mapping statement to a location to a level above the current level of the mapping statement in the hierarchy. For example, consider a portion of a hierarchy of mapping statements illustrated in FIG. 7 and represented as "Employee to Worker" "Employee"/"Employee to Manager." The statement "Employee" is a child of statement "Employee to Worker" and statement "Employee to Manager" is a child of statement "Employee". The statement "Employee to Manager" can be promoted to become a child of statement "Employee to Worker" such that "Employee to Manager" is at the same level as "Employee".

The statement editor 230 is also configured to receive from the client application 170 information describing input indicating demotion of a mapping statement in the hierarchy. Demoting a mapping statement causes the mapping statement to be moved to a location at a level below the current level of the mapping statement in the hierarchy. For example, assume that in the above example, along with the mapping statements "Employee to Worker"/"Employee"/"Employee to Manager" there is a statement "Staff" that is also a child node of statement "Employee to Worker." The statement "Staff" is at the same level in the hierarchy as "Employee." The statement "Staff" can be demoted to become a child of statement "Employee" such that 'Staff' is at the same level as "Employee to Manager."

The mapping statement being inserted in a target location as a result of cut-and-paste, copy-and-paste, promote or demote operations may specify path expressions to identify nodes being processed by the mapping statement. For example, the mapping statement may determine value of an output node in an output hierarchical data structure based on the value of an input node in an input hierarchical data structure. The mapping statement specifies the input and output nodes using path expressions, for example, XPath expressions. Accordingly, the mapping statement in this example specifies an input path expression to identify the input node and an output path expression to identify the output node.

A path expression may be an absolute path expression that specifies the entire path from the root of the hierarchical data structure to a particular node. Alternatively, the path expression may be a relative path expression that is specified with respect to a context node. The context node is a node within the hierarchical data structure that may be associated with a mapping statement. To determine the full path of a relative path expression, the data processor 130 combines the relative path expression with the path of the context node. For example, the data processor 130 may add the path expression of the context node as a prefix to the path specified by the relative path expression.

If the mapping statement processes multiple hierarchical statements, each hierarchical data structure may be associated with a context. For example, if the mapping statement maps nodes from an input hierarchical data structure to an output hierarchical data structure, the mapping statement may be associated with an input context node corresponding to the input hierarchical data structure and an output context node corresponding to an output hierarchical data structure.

The association between a mapping statement and a context node depends on the location of the mapping statement in the hierarchy. Accordingly, if the statement editor 230 moves the mapping statement within the hierarchy, the context of the mapping statement may change. The statement editor 230 obtains the context node for a mapping statement from the specification of the mapping statement or from the specification of an ancestor of the mapping statement within the hierarchy. Accordingly, a mapping statement may specify a context node that is applicable to children statements or other descendants of the mapping statement. For example, a group statement may specify a context node that is applicable to all statements within the group node. Similarly, a router statement may specify a context that is applicable to all option statements and the default statement of the router statement.

The validation module 260 processes the path expressions of the mapping statement to verify whether the path expressions are valid if the mapping statement is inserted in a target location of the hierarchy of mapping statement. For example, if statement editor 230 moves a mapping statement from a source location in the hierarchy to a target location, the context of the target location may be different from the context of the source location. A path expression that may be valid in the context of the source location may not be valid in the context of the target location.

Figure 10:
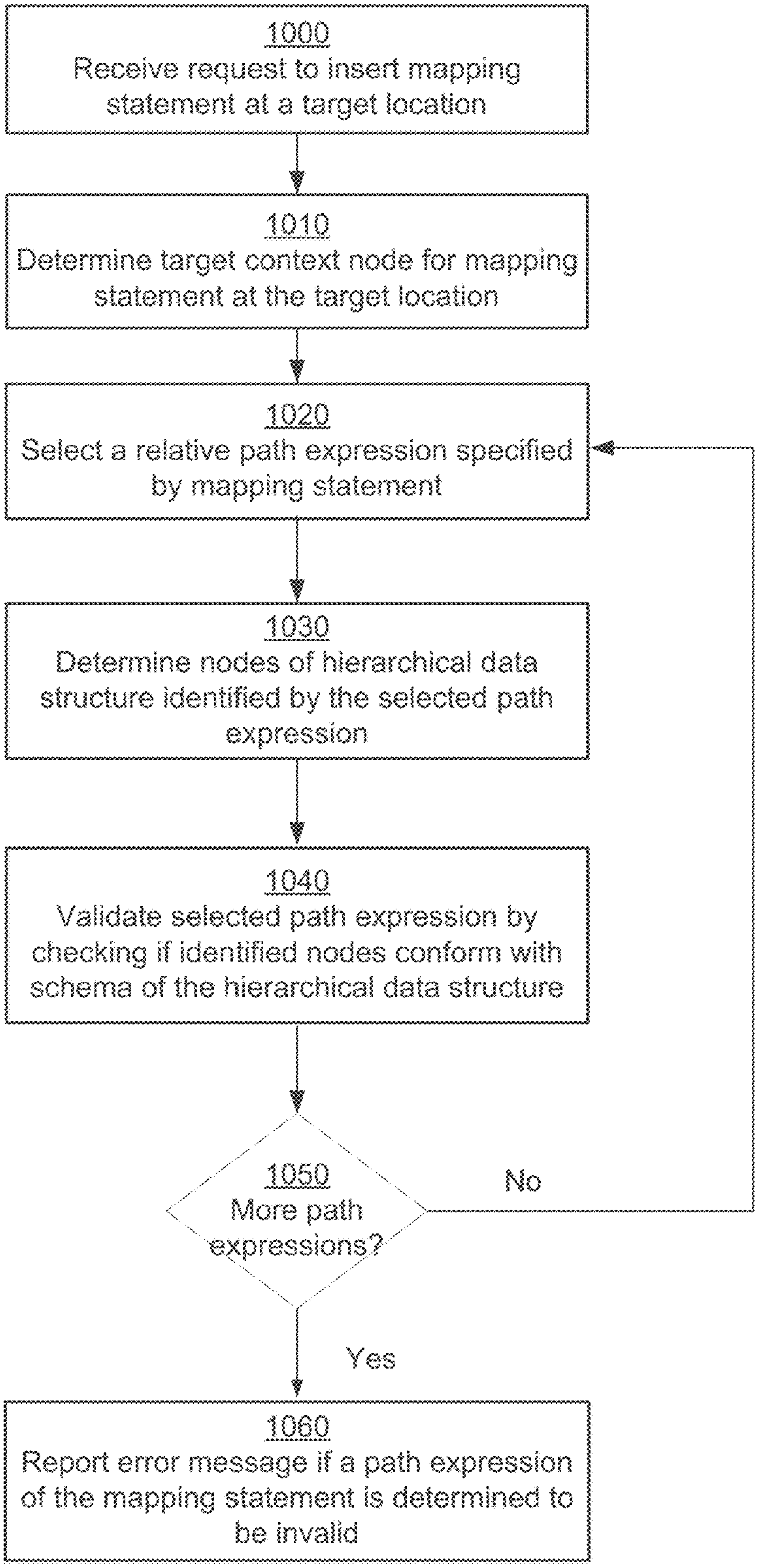
FIG. 10 shows a flowchart illustrating the process of validating path expressions of a mapping statement inserted in the hierarchy at a given location, according to an embodiment.

FIG. 10 shows a flowchart illustrating the process of validating path expressions of a mapping statement inserted in the hierarchy at a given location, according to an embodiment. The statement editor 230 receives from the client application 170, a request to insert a mapping statement at a target location within the hierarchy of mapping statements displayed using the grid view 460, for example, as shown in FIG. 8D. The request to insert the mapping statement may be performed by a user via an explicit gesture, for example, to promote or demote a statement or to cut-and-paste or copy-and-paste a statement from a source location to a target location. The steps of the flowchart of FIG. 10 can be executed by various modules of the mapping system 100, for example, the validation module 260 but can be executed by other modules as well.

The mapping system 100 determines 1010 a target context node for the mapping statement at the target location. In an embodiment, mapping system 100 determines the context for a mapping statement by checking if the mapping statement specifies the context. If the mapping statement specifies a context, the context is used as the context of the mapping statement. If the mapping statement does not specify a context, the mapping system 100 determines the parent of the mapping statement and checks whether the parent of the mapping statement specifies the context. If the parent of the mapping statement specifies the context, that context is used as the context of the mapping statement. If the parent of the mapping statement does not specify the context, the mapping system 100 continues moving up the hierarchy inspecting each mapping statement along the way and selects the context of the first mapping statement that specifies the context. Accordingly, the mapping system 100 selects the context of the lowest ancestor of the mapping statement in the hierarchy that specifies a context as the context of the mapping statement.

The mapping system 100 validates all relative path expressions specified by the mapping statement. The mapping system 100 selects 1020 a relative path expression specified by the mapping statement. The path expression may be specified by the mapping statement to identify a node in the hierarchical data structure being processed by the mapping statement. The mapping system 100 determines 1030 nodes of the hierarchical data structure identified by the selected path expression. The selected path expression may identify multiple nodes of the hierarchical data structure. In this situation, the mapping system 100 ensures that all possible nodes identified by the path expression are valid with respect to the target context node of the mapping statement. The mapping system 100 validates 1040 the selected path expression by checking if the identified nodes of the selected path expression conform to the schema of the hierarchical data structure. For example, mapping system 100 may combine the relative path expression with the target context node and check whether the nodes identified by the path expression are invalid with respect to the schema of the hierarchical data structure. If the mapping system 100 determines that a selected path expression is invalid, the mapping system 100 marks the path expression for reporting to the user.

The mapping system 100 checks 1050 if there are any more path expressions of the mapping statement that need to be validated. If the mapping system 100 determines that there are more path expressions of the mapping statement that need to be validated, the mapping system 100 repeats the steps 1020, 1030, 1040, and 1050 for a path expression that is not yet processed. If the mapping system 100 determines that all path expressions of the mapping statement are processed, the mapping system 100 reports 1060 error messages for path expressions that are determined to be invalid.

In an embodiment, the steps shown in FIG. 10 may be performed in an order different from that indicated in the flowchart. For example, the mapping system 100 may report 1060 error messages for invalid path expressions as the mapping system 100 validates 1040 the path expressions and determines them to be invalid before all path expressions are processed.

In an embodiment, the mapping system 100 provides the user with options to correct the errors reported for invalid path expressions. In an embodiment, the statement editor 230 reports the error to the user via a user interface, for example, the user interface similar to that shown in FIG. 5. The statement editor 230 provides the user with an option to insert the mapping statement back in the source location where the mapping statement was originally located. If the statement editor 230 receives a selection of this option, the statement editor 230 restores the mapping statement to the original location. This allows the user to move the statement to another location. Alternatively, the statement editor 230 provides the user with an option to manually correct the error, for example, by moving the mapping statement to a new location. The user can also correct the error by manually modifying the context associated with the target location.

Although the validation process is described for mapping statements, the validation may be performed if a user moves a portion of the mapping statement, for example, an expression or a subexpression. For example, an option statement may specify a condition expression and the user may cut-and-paste a portion of the condition expression and insert it in another option statement.

Furthermore, a complex path expression may evaluate to multiple individual path expressions. The mapping system 100 performs validation of all these individual path expressions. For example, the complex path expression "(Management|Legal)/Employees" evaluates to path expressions "Management/Employees" and "Legal/Employees." If a statement including the complex path expression "(Management|Legal)/Employees" is moved to a target location, the mapping system 100 validates both "Management/Employees" and "LegaL/Employees" path expressions.

Another example of complex path expressions is "for $v in countries/country return if ($v/government/type='presidential') then $v/president else $v/prime-minister." This complex path expression processes a list of "country" nodes and determines their leaders as either "president" or "prime-minister" based on the "type" of the "government" of the "country" node. This complex path expression includes path expressions "countries/country/government/type," "countries/country/president" and "countries/country/prime-minister." If a statement including the complex path expression is moved to a target location, the data mapping system 100 validates all three of these path expressions.

Another example of a complex path expression is "Employee[id=$targetid]/FirstName." The complex path expression evaluates to a path expression "Employee/FirstName" and includes a path expression "Employee/id." The mapping system 100 validates the complex path expression by validating both path expressions "Employee/FirstName" and "Employee/id."

Figure 11:
FIG. 11 shows a screenshot of the user interface showing an error message obtained by attempting to validate an invalid expression, according to an embodiment.

FIG. 11 shows a screenshot of the client application 170 showing an error message 1100 obtained by attempting to validate an invalid expression, according to an embodiment. The expression editor UI 825 presents the error message 1100 if the user attempts to move a mapping statement from a source location in the hierarchy to a target location and the mapping statement is not valid in the target location due to a change in context.

The client application 170 provides a suggested XPath modification to correct the problem. As shown in FIG. 11, the expression editor 240 provides the user with the option to use the original XPath expressions 1120 or to use an adjusted Xpath expression 1110 for the inputs. Similarly, the expression editor 240 provides the user with the option to use the original XPath expressions 1160 or to use an adjusted Xpath expression 1150 for the output.

The expression editor 240 also provides context information to aid a user understand the cause of the error. The expression editor 240 presents the current context 1130 based on the target location and the previous context 1140 based on the source location of the input. Similarly, the expression editor 240 presents current context 1170 based on the target location and the previous context 1180 based on the source location for the output. The user can use the context information to determine which path expressions to use for the input or output.

Alternative Embodiments

It is to be understood that the Figures and descriptions of the present invention have been simplified to illustrate elements that are relevant for a clear understanding of the present invention, while eliminating, for the purpose of clarity, many other elements found in a typical IT management system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method executed by one or more computing devices for modifying mapping statements for mapping data between hierarchical data structures, the method comprising:

storing, by at least one of the one or more computing devices, a hierarchy of mapping statements configured to map a source hierarchical data structure to a target hierarchical data structure, wherein execution of each mapping statement comprises execution of any mapping statements below that mapping statement in the hierarchy;

receiving, by at least one of the one or more computing devices, a request to insert a mapping statement at a selected location in the hierarchy of mapping statements, the mapping statement specifying one or more relative path expressions, each relative path expression identifying either one or more source nodes or one or more target nodes;

determining, by at least one of the one or more computing devices, a source context node of the source hierarchical data structure and a target context node of the target hierarchical data structure for the mapping statement based at least in part on the selected location in the hierarchy of mapping statements;

generating, by at least one of the one or more computing devices, one or more absolute path expressions by combining each relative path expression which identifies one or more source nodes with the source context node and combining each relative path expression which identifies one or more target nodes with the target context node;

determining, by at least one of the one or more computing devices, whether the one or more absolute path expressions are valid based at least in part on one or more of: a source schema corresponding to the source hierarchical data structure or a target schema corresponding to the target hierarchical data structure; and transmitting, by at least one of the one or more computing devices, a message indicating a failure to insert the mapping statement based at least in part on a determination that at least one of the one or more absolute path expressions is not valid.

2. The method of claim 1, wherein the selected location specifies a parent mapping statement under which the mapping statement is requested to be inserted.

3. The method of claim 2, wherein the selected location further specifies a position in a sequence of mapping statements under the parent mapping statement, wherein the mapping statement j requested to be inserted in the sequence based on the position.

4. The method of claim 1, wherein determining a source context node of the source hierarchical data structure and a target context node of the target hierarchical data structure for the mapping statement based at least in part on the selected location in the hierarchy of mapping statements comprises:

identifying a second mapping statement that would be an ancestor of the mapping statement if it were inserted into the hierarchy of mapping statements at the selected location;

retrieving an input path for the source context node and an output path for the target context node from the second mapping statement.

5. The method of claim 1, wherein each of the one or more absolute path expressions corresponds to either the source hierarchical data structure or the target hierarchical data structure and wherein determining whether the one or more absolute path expressions are valid comprises, for each absolute path expression in the one or more absolute path expressions:

determining whether the absolute path expression conforms to a schema, wherein the schema comprises the source schema when the absolute path expression corresponds to the source hierarchical data structure and wherein the schema comprises the target schema when the absolute path expression corresponds to the source hierarchical data structure.

6. The method of claim 5, wherein determining whether the absolute path expression conforms to a schema comprises;

determining whether any node identified by the absolute path expression is absent from the schema.

7. The method of claim 1, wherein the request to insert the mapping statement comprises one of:

a request to promote the mapping statement, wherein promoting the mapping statement comprises moving the mapping statement from a lower location below the selected location in the hierarchy of mapping statements;

a request to demote the mapping statement, wherein demoting the mapping statement comprises moving the mapping statement from a higher location above the selected location in the hierarchy of mapping statements;

a request to copy the mapping statement from a different location in the hierarchy of mapping statements and insert the mapping statement in the selected location; or a request to delete the mapping statement from a different location in the hierarchy of mapping statements and insert the mapping statement in the selected location.

8. A system for modifying mapping statements for mapping data between hierarchical data structures, the system comprising:

one or more processors; and one or more memories operatively coupled to at least one of the one or more processors and having instructions stored thereon that, when executed by at least one of the one or more processors, cause at least one of the one or more processors to:

store a hierarchy of mapping statements configured to map a source hierarchical data structure to a target hierarchical data structure, wherein execution of each mapping statement comprises execution of any mapping statements below that mapping statement in the hierarchy;

receive a request to insert a mapping statement at a selected location in the hierarchy of mapping statements, the mapping statement specifying one or more a relative path expressions, each relative path expression identifying either one or more source nodes or one or more target nodes;

determine a source context node of the source hierarchical data structure and a target context node of the target hierarchical data structure for the mapping statement based at least in part on the selected location in the hierarchy of mapping statements;

generate one or more absolute path expressions by combining each relative path expression which identifies one or more source nodes with the source context node and combining each relative path expression which identifies one or more target nodes with the target context node;

determine whether the one or more absolute path expressions are valid based at least in part on one or more of: a source schema corresponding to the source hierarchical data structure or a target schema corresponding to the target hierarchical data structure; and transmit a message indicating a failure to insert the mapping statement based at least in part on a determination that at least one of the one or more absolute path expressions is not valid.

9. The system of claim 8, wherein the selected location specifies a parent mapping statement under which the mapping statement is requested to be inserted.

10. The system of claim 9, wherein the selected location further specifies a position in a sequence of mapping statements under the parent mapping statement, wherein the mapping statement is requested to be inserted in the sequence based on the position.

11. The system of claim 8, wherein the instructions that, when executed by at least one of the one or more processors, cause at least one of the one or more processors to determine a source context node of the source hierarchical data structure and a target context node of the target hierarchical data structure for the mapping statement based at least in part on the selected location in the hierarchy of mapping statements further cause at least one of the one or more processors to:

identify a second mapping statement that would be an ancestor of the mapping statement if it were inserted into the hierarchy of mapping statements at the selected location; and retrieving an input path for the source context node and an output path for the target context node from the second mapping statement.

12. The system of claim 8, wherein each of the one or more absolute path expressions corresponds to either the source hierarchical data structure or the target hierarchical data structure and wherein the instructions that, when executed by at least one of the one or more processors, cause at least one of the one or more processors to determine whether the one or more absolute path expressions are valid further cause at least one of the one or more processors to, for each absolute path expression in the one or more absolute path expressions:

determine whether the absolute path expression conforms to a schema, wherein the schema comprises the source schema when the absolute path expression corresponds to the source hierarchical data structure and wherein the schema comprises the target schema when the absolute path expression corresponds to the source hierarchical data structure.

13. The system of claim 12, wherein the instructions that, when executed by at least one of the one or more processors, cause at least one of the one or more processors to determine whether the absolute path expression conforms to a schema further cause at least one of the one or more processors to:

determine whether any node identified by the absolute path expression is absent from the schema.

14. The system of claim 8, wherein the request to insert the mapping statement comprises one of:

a request to promote the mapping statement, wherein promoting the mapping statement comprises moving the mapping statement from a lower location below the selected location in the hierarchy of mapping statements;

a request to demote the mapping statement, wherein demoting the mapping statement comprises moving the mapping statement from a higher location above the selected location in the hierarchy of mapping statements;

a request to copy the mapping statement from a different location in the hierarchy of mapping statements and insert the mapping statement in the selected location; or a request to delete the mapping statement from a different location in the hierarchy of mapping statements and insert the mapping statement in the selected location.

15. At least one non-transitory computer-readable medium storing computer-readable instructions that, when executed by one or more computing devices, cause at least one of the one or more computing devices to:

store a hierarchy of mapping statements configured to map a source hierarchical data structure to a target hierarchical data structure, wherein execution of each mapping statement comprises execution of any mapping statements below that mapping statement in the hierarchy;

receive a request to insert a mapping statement at a selected location in the hierarchy of mapping statements, the mapping statement specifying one or more a relative path expressions, each relative path expression identifying either one or more source nodes or one or more target nodes;

determine a source context node of the source hierarchical data structure and a target context node of the target hierarchical data structure for the mapping statement based at least in part on the selected location in the hierarchy of mapping statements;

generate one or more absolute path expressions by combining each relative path expression which identifies one or more source nodes with the source context node and combining each relative path expression which identifies one or more target nodes with the target context node;

determine whether the one or more absolute path expressions are valid based at least in part on one or more of: a source schema corresponding to the source hierarchical data structure or a target schema corresponding to the target hierarchical data structure; and transmit a message indicating a failure to insert the mapping statement based at least in part on a determination that at least one of the one or more absolute path expressions is not valid.

16. The at least one non-transitory computer-readable medium of claim 15, wherein the selected location specifies a parent mapping statement under which the mapping statement is requested to be inserted.

17. The at least one non-transitory computer-readable medium of claim 16, wherein the selected location further specifies a position in a sequence of mapping statements under the parent mapping statement, wherein the mapping statement is requested to be inserted in the sequence based on the position.

18. The at least one non-transitory computer-readable medium of claim 15, wherein the instructions that, when executed by at least one of the one or more computing devices, cause at least one of the one or more computing devices to determine a source context node of the source hierarchical data structure and a target context node of the target hierarchical data structure for the mapping statement based at least in part on the selected location in the hierarchy of mapping statements further cause at least one of the one or more computing devices to:

identify a second mapping statement that would be an ancestor of the mapping statement if it were inserted into the hierarchy of mapping statements at the selected location; and retrieving an input path for the source context node and an output path for the target context node from the second mapping statement.

19. The at least one non-transitory computer-readable medium of claim 15, wherein each of the one or more absolute path expressions corresponds to either the source hierarchical data structure or the target hierarchical data structure and wherein the instructions that, when executed by at least one of the one or more computing devices, cause at least one of the one or more computing devices to determine whether the one or more absolute path expressions are valid further cause at least one of the one or more computing devices to, for each absolute path expression in the one or more absolute path expressions:

determine whether the absolute path expression conforms to a schema, wherein the schema comprises the source schema when the absolute path expression corresponds to the source hierarchical data structure and wherein the schema comprises the target schema when the absolute path expression corresponds to the source hierarchical data structure.

20. The at least one non-transitory computer-readable medium of claim 19, wherein the instructions that, when executed by at least one of the one or more computing devices, cause at least one of the one or more computing devices to determine whether the absolute path expression conforms to a schema further cause at least one of the one or more computing devices to:

determine whether any node identified by the absolute path expression is absent from the schema.

21. The at least one non-transitory computer-readable medium of claim 15, wherein the request to insert the mapping statement comprises one of:

a request to promote the mapping statement, wherein promoting the mapping statement comprises moving the mapping statement from a lower location below the selected location in the hierarchy of mapping statements;

a request to demote the mapping statement, wherein demoting the mapping statement comprises moving the mapping statement from a higher location above the selected location in the hierarchy of mapping statements;

a request to copy the mapping statement from a different location in the hierarchy of mapping statements and insert the mapping statement in the selected location; or a request to delete the mapping statement from a different location in the hierarchy of mapping statements and insert the mapping statement in the selected location.

* * * * *